United States Patent
Kim

(10) Patent No.: US 11,956,376 B2
(45) Date of Patent: Apr. 9, 2024

(54) MEMORY DEVICE AND MEMORY SYSTEM HAVING THE SAME

(71) Applicant: Samsung Electronics Co., Ltd., Suwon-si (KR)

(72) Inventor: Hyung Seuk Kim, Seongnam-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 141 days.

(21) Appl. No.: 16/992,356

(22) Filed: Aug. 13, 2020

(65) Prior Publication Data

US 2021/0184871 A1 Jun. 17, 2021

(30) Foreign Application Priority Data

Dec. 17, 2019 (KR) .................. 10-2019-0168800

(51) Int. Cl.
| | | |
|---|---|---|
| *G11C 7/08* | (2006.01) | |
| *G06F 21/60* | (2013.01) | |
| *G06F 21/72* | (2013.01) | |
| *G06F 21/75* | (2013.01) | |
| *G11C 7/06* | (2006.01) | |
| *G11C 7/24* | (2006.01) | |
| *G11C 16/04* | (2006.01) | |
| *G11C 16/08* | (2006.01) | |
| *G11C 16/22* | (2006.01) | |
| *G11C 16/24* | (2006.01) | |
| *G11C 16/26* | (2006.01) | |
| *H04L 9/08* | (2006.01) | |
| *H04L 9/32* | (2006.01) | |

(52) U.S. Cl.
CPC .......... *H04L 9/3278* (2013.01); *G06F 21/602* (2013.01); *G06F 21/72* (2013.01); *G06F 21/75* (2013.01); *G11C 7/062* (2013.01); *G11C 7/08* (2013.01); *G11C 7/24* (2013.01); *G11C 16/0483* (2013.01); *G11C 16/08* (2013.01); *G11C 16/22* (2013.01); *G11C 16/24* (2013.01); *G11C 16/26* (2013.01); *H04L 9/0869* (2013.01)

(58) Field of Classification Search
CPC ... H04L 9/0861; H04L 9/0869; H04L 9/3271; H04L 9/3278; G06F 21/602; G06F 21/71; G06F 21/72; G06F 21/75; G11C 7/062; G11C 7/08; G11C 7/24; G11C 16/04; G11C 16/0483; G11C 16/06; G11C 16/08; G11C 16/22; G11C 16/24; G11C 16/26
See application file for complete search history.

(56) References Cited

U.S. PATENT DOCUMENTS

| | | | |
|---|---|---|---|
| 8,300,450 | B2 | 10/2012 | Christensen et al. |
| 9,202,531 | B2 | 12/2015 | Seo |
| 9,704,602 | B2 | 7/2017 | Kim et al. |
| 9,773,544 | B2 | 9/2017 | Woo et al. |
| 9,990,181 | B2 | 6/2018 | La Fratta et al. |
| 10,074,408 | B2 | 9/2018 | Seo |
| 10,152,257 | B2 | 12/2018 | Rodriguez et al. |
| 10,216,484 | B2 | 2/2019 | Peeters et al. |
| 10,224,093 | B2 | 3/2019 | Kim et al. |
| 2013/0234771 | A1 | 9/2013 | Simons et al. |
| 2016/0087805 | A1* | 3/2016 | Li .................... H04L 9/3278 713/193 |
| 2016/0148664 | A1* | 5/2016 | Katoh ............... H04L 9/0866 365/148 |
| 2016/0336055 | A1* | 11/2016 | Kato ................ H10B 12/315 |
| 2017/0069368 | A1* | 3/2017 | Woo ................ G11C 11/4094 |
| 2017/0272258 | A1* | 9/2017 | Tanamoto ........... G11C 11/1675 |
| 2018/0102163 | A1* | 4/2018 | Lin .................... G09C 1/00 |
| 2018/0123808 | A1* | 5/2018 | Hung ............... H04L 9/0866 |
| 2018/0176012 | A1* | 6/2018 | Hung ................. G11C 7/24 |
| 2018/0191512 | A1* | 7/2018 | Tomishima ........... G09C 1/00 |
| 2019/0058603 | A1 | 2/2019 | Lin et al. |
| 2020/0213138 | A1* | 7/2020 | Mondello ......... G11C 16/0483 |

OTHER PUBLICATIONS

Christoph Bohm, et al. "A Microcontroller SRAM-PUF", 978-1-4577-0460-4/11/ 2011 IEEE.

* cited by examiner

*Primary Examiner* — D'Arcy Winston Straub
(74) *Attorney, Agent, or Firm* — Harness, Dickey & Pierce, P.L.C.

(57) ABSTRACT

A memory system includes a plurality of memory cells at intersections between a plurality of word lines and a plurality of bit lines, and a plurality of bit line sense amplifiers connected to the plurality of bit lines, the plurality of bit line sense amplifiers configured to write data to or read data from the plurality of memory cells through the plurality of bit lines, a redundancy bit line sense amplifier among the plurality of bit line sense amplifiers configured to generate a physically unclonable function (PUF) key including a unique random digital value.

20 Claims, 21 Drawing Sheets

MEMORY DEVICE AND MEMORY SYSTEM HAVING THE SAME

CROSS-REFERENCE TO RELATED APPLICATION(S)

This application claims benefit of priority to Korean Patent Application No. 10-2019-0168800 filed on Dec. 17, 2019 in the Korean Intellectual Property Office, the disclosure of which is incorporated herein by reference in its entirety.

BACKGROUND

The present inventive concepts relate to a memory device and a memory system including the same.

In the field of hardware security, key information such as an ID, a security key, or the like, which may be unique information of a chip, should not be lost even when power is not supplied. For this reason, a method most commonly used is to store data (e.g., key information) in a Non-Volatile Memory (NVM) such as an Electrically Erasable Programmable Read-Only Memory (EEPROM) or the like. However, in case of storing such data in a NVM, data should be managed separately, and there is a risk of data leakage when the management thereof is neglected. In addition, even after the data is stored, the data stored in the memory may be read by various physical security attacks. One approach to solving this challenge is physically unclonable function (PUF) technology.

SUMMARY

An aspect of the present inventive concepts is to provide a memory device capable of generating unpredictable, or difficult to predict, chip-specific information by using a distribution of elements included in a memory device.

According to an aspect of the present inventive concepts, a memory system includes a plurality of memory cells at intersections between a plurality of word lines and a plurality of bit lines, and a plurality of bit line sense amplifiers connected to the plurality of bit lines, the plurality of bit line sense amplifiers configured to write data to or read data from the plurality of memory cells through the plurality of bit lines, a redundancy bit line sense amplifier among the plurality of bit line sense amplifiers configured to generate a physically unclonable function (PUF) key including a unique random digital value.

According to an aspect of the present inventive concepts, a memory device includes a memory cell array including a plurality of memory cells at intersections between a plurality of word lines and a plurality of bit lines, a first bit line sense amplifier connected to a first bit line among the plurality of bit lines, the first bit line sense amplifier configured to operate as a data sense amplifier including writing data to or reading data from the plurality of memory cells through the first bit line, and a second bit line sense amplifier connected to a second bit line among the plurality of bit lines, the second bit line sense amplifier configured to operate as a physically unclonable function (PUF) bit line sense amplifier including generating a PUF key as a unique random digital value.

According to an aspect of the present inventive concepts, a memory device includes a plurality of memory cells at intersections between a plurality of word lines and a plurality of bit lines, a plurality of bit line sense amplifiers connected to the plurality of bit lines, the plurality of bit line sense amplifiers configured to write data to or read data from the plurality of memory cells through the plurality of bit lines, a first bit line sense amplifier among the plurality of bit line sense amplifiers being connected to a first bit line among the plurality of bit lines, a second bit line sense amplifier among the plurality of bit line sense amplifiers being connected to a second bit line among the plurality of bit lines, each of the first bit line sense amplifier and the second bit line sense amplifier including a pair of first transistors and a pair of second transistors, and processing circuitry configured to output a first driving signal during a presensing operation, the first driving signal configured to drive the pair of first transistors of the first bit line sense amplifier, the pair of first transistors of the first bit line sense amplifier being driven before the pair of second transistors of the first bit line sense amplifier are driven, the presensing operation including presensing voltages of the plurality of bit lines and voltages of a plurality of complementary bit lines corresponding to the plurality of bit lines, and output a second driving signal during the presensing operation, the second driving signal configured to drive the pair of second transistors of the second bit line sense amplifier, the pair of second transistors of the second bit line sense amplifier being driven before the pair of first transistors of the second bit line sense amplifier are driven.

BRIEF DESCRIPTION OF DRAWINGS

The above and other aspects, features, and advantages of the present inventive concepts will be more clearly understood from the following detailed description, taken in conjunction with the accompanying drawings, in which.

DETAILED DESCRIPTION

Hereinafter, some example embodiments of the present inventive concepts will be described with reference to the accompanying drawings.

Figure 1:
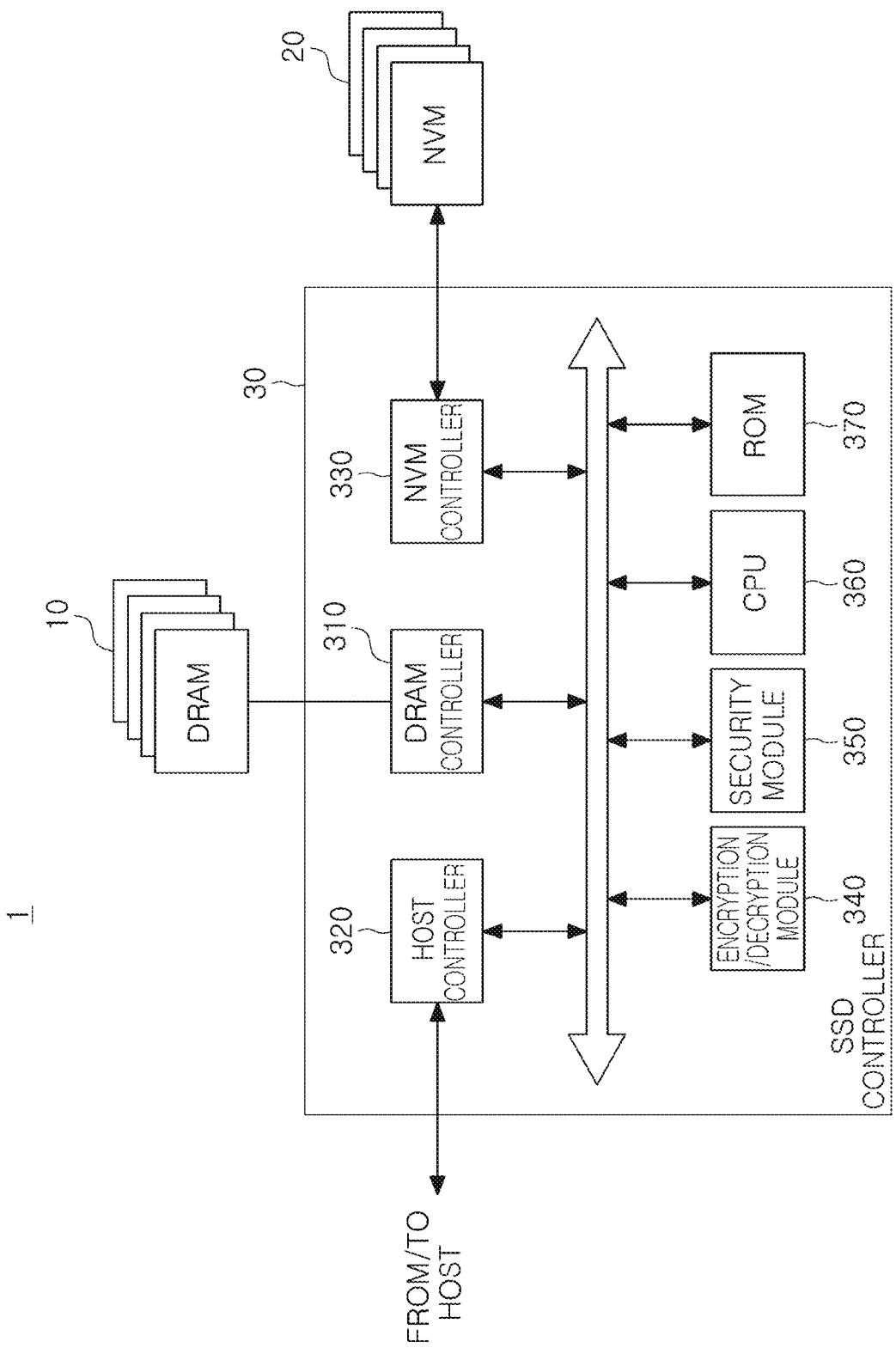
FIG. 1 is a block diagram schematically illustrating a memory system according to some example embodiments of the present inventive concepts.

FIG. 1 is a block diagram schematically illustrating a memory system according to some example embodiments of the present inventive concepts.

Referring to FIG. 1, a memory system 1 may include a first memory module 10, a second memory module 20, and/or a memory controller 30. The first memory module 10, the second memory module 20, and the memory controller 30 may be integrated into a single semiconductor device. For example, the first memory module 10, the second memory module 20, and the memory controller 30 may be integrated into the single semiconductor device to form a Solid State Drive (SSD). Accordingly, the memory controller 30 may be an SSD controller.

The first memory module 10 may include a volatile memory such as a Dynamic Random Access Memory (DRAM), a Synchronous Dynamic Random Access Memory (SDRAM), a Double Data Rate SDRAM (DDR SDRAM), a Low Power Double Data Rate SDRAM (LPDDR SDRAM), a Static Random Access Memory (SRAM), or the like, and/or a non-volatile memory such as a Ferroelectric Random Access Memory (FRAM), a Resistive Random Access Memory (ReRAM), a Spin-Transfer Torque Magneto-resistive Random Access Memory (STT-MRAM), a Phase Random Access Memory (PRAM), or the like. The first memory module 10 may be used as a buffer memory for temporarily storing data received from a host and/or data received from the second memory module 20. According to some example embodiments, the first memory module 10 may be used to store a mapping table for converting a logical address viewed by the host into a physical address of a flash memory.

The second memory module 20 may be implemented with various non-volatile memory devices such as a Read Only Memory (ROM), an Erasable Programmable ROM (EPROM), and Electrically Erasable Programmable ROM (EEPROM), a NAND flash memory, a NOR flash memory, a PRAM, a ReRAM, a FRAM, and/or a STT-MRAM.

The memory controller 30 may include a DRAM controller 310, a host controller 320, a non-volatile memory (NVM) controller 330, an encryption/decryption module 340, a security module 350, a CPU 360, and/or a ROM 370.

The DRAM controller 310 may control reading and/or writing operations of the first memory module 10. For example, the DRAM controller 310 may temporarily store write data to, or read data from, the first memory module 10.

The host controller 320 may process reading and/or writing commands from a host (e.g., an external device, an external processor, etc.). The host controller 320 may provide an interface for communication between the host and the memory system 1 under control of the CPU 360. For example, the interface may include at least one of a Peripheral Component Interconnect (PCI) express, a Small Computer System Interface (SCSI) interface, an Advanced Technology Attachment (ATA) interface, a Serial ATA (SATA) interface, a Parallel ATA (PATA) interface, and/or a Serial Attached SCSI (SAS) interface. According to some example embodiments, the interface may be an NVM express (NVMe) that exchanges data in a PCI express manner.

The non-volatile memory controller 330 may control reading and/or writing operations of the second memory module 20.

The encryption/decryption module 340 may encrypt data transmitted from the host or may decrypt the encrypted data. The encryption/decryption module 340 may perform symmetric-key cryptography.

The symmetric-key cryptography, also known as secret-key cryptography, may refer to cryptography, in which a key used to encrypt data is identical or similar to a key used to decrypt data. For example, the symmetric-key cryptography may include a Data Encryption Standard (DES) scheme, an Advanced Encryption Standard (AES) scheme, and/or the like.

The CPU 360 may interpret a plurality of host instructions that enter a command queue, and may read data from, or write data to, the second memory module 20 through the non-volatile memory controller 30. The CPU 360 may operate according to firmware provided for various control operations of the memory controller 30. For example, the CPU 360 may execute a Flash Translation Layer (FTL) for performing garbage collection, address mapping, and/or wear leveling for managing the second memory module 20. The CPU 360 may execute firmware that supports an In-Storage Computing (ISC) function provided from the ROM 370.

The security module 350 may perform public-key cryptography. The public-key cryptography, also known as asymmetric-key cryptography, may refer to cryptography in which a key used to decrypt data is different from a key used to encrypt data. For example, the public-key cryptography may include a Hellman scheme, a Rivest-Shamir-Adleman (RSA) scheme, an ElGamal scheme, an elliptical curve scheme, or the like.

The security module 350 may perform an authentication operation and/or a verification operation of the memory system 1. For example, when a program such as a bootloader and/or firmware is first generated or updated, the security module 350 may perform an operation of authenticating the program. In addition, when the memory system 1 is booted and a program is loaded or updated, the security module 350 may perform an operation of verifying the program. The security module 350 may be implemented as a separate chip, different from the memory system 1.

Even when the same operation, or a similar operation, is performed in a semiconductor manufacturing process, process variations may occur due to characteristics of the semiconductor manufacturing process. Due to the process variations, there may be a difference in many fields from device characteristics such as transistors, capacitors, and/or resistors, to circuit characteristics such as gate delay time. The higher the difference, the higher the distribution, and the high distribution may generate different digital values of 0 or 1 for each chip. Unlike a device that generates a random number, the same value or a similar value may be output every time digital values are generated, which are used as chip-specific information. A Physically Unclonable Function (PUF) may refer to a function or system that generates a large amount of unpredictable random digital values implemented in a chip by using the high distribution. Since the unpredictable values are output by hardware, replication is not possible. As used herein, the terms "random" or "unpredictable" may refer to values (e.g., numbers, etc.) that are random or substantially random, and/or unpredictable or nearly unpredictable, respectively.

According to some example embodiments of the present inventive concepts, the memory system 1 may generate chip-specific information from the first memory module 10 in a PUF operation mode. The memory system 1 may generate unpredictable chip-specific information by using a distribution of devices included in the first memory module 10 in the PUF operation mode. Therefore, random digital values that cannot be modulated and/or duplicated, or digital values that are difficult to modulate and/or duplicate, may be generated.

Figure 2:
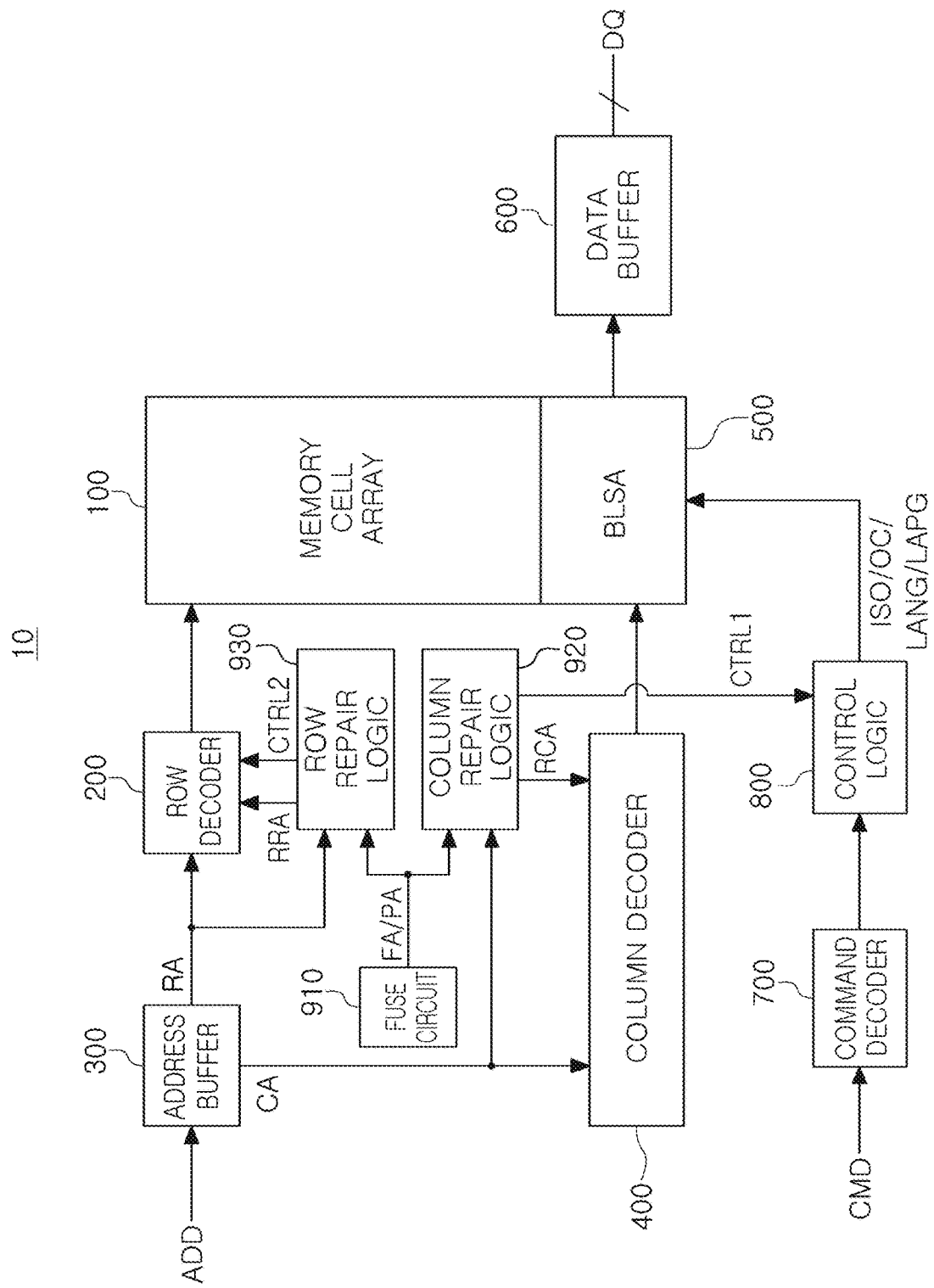
FIG. 2 is a block diagram illustrating a memory device according to some example embodiments of the present inventive concepts.

FIG. 2 is a block diagram illustrating a memory device according to some example embodiments of the present inventive concepts. Referring to FIG. 2, a memory device 10 of the present inventive concepts may include a memory cell array 100, a row decoder 200, an address buffer 300, a column decoder 400, a plurality of bit line sense amplifiers (BLSA) 500, a data buffer 600, a command decoder 700, a control logic 800, a fuse circuit 910, a column repair logic 920, and/or a row repair logic 930. According to some example embodiments, the memory device 10 may be the same as or similar to the memory module 10.

The memory cell array 100 may include a plurality of memory cells and a plurality of redundancy memory cells. The plurality of memory cells may be provided at points at which a plurality of word lines and a plurality of bit lines intersect each other. For example, each of the plurality of memory cells may be connected to a single word line and a single bit line.

Each of the plurality of memory cells may include a switch element and an information storage capacitor. In some example embodiments, the switch element may include a transistor. A gate terminal of the transistor may be connected to a word line. One end (e.g., a drain terminal) of the transistor may be connected to a bit line or a complementary bit line. The other end (e.g., a source terminal) of the transistor may be connected to the information storage capacitor.

According to some example embodiments, a portion of the plurality of memory cells and the plurality of redundancy memory cells may operate as a PUF. A memory cell operating as a PUF may be referred to as a PUF cell. According to some example embodiments, a portion of the plurality of bit lines may operate as a PUF. A bit line operating as a PUF may be referred to as a PUF bit line.

The address buffer 300 may temporarily store an address (ADD) input from the memory controller (e.g., the memory controller 30). The address buffer 300 may output a row address (RA) included in the address (ADD) to the row decoder 200. The address buffer 300 may output a column address (CA) included in the address (ADD) to the column decoder 400.

The row decoder 200 may decode a row address (RA) to determine a single word line corresponding to the row address (RA), among the plurality of word lines, as a selected word line. The row decoder 200 may activate (e.g., connect, selected, power, etc.) the selected word line.

The column decoder 400 may decode a column address (CA) to determine a single bit line corresponding to the column address (CA), among the plurality of bit lines, as a selected bit line. The row decoder 200 and the column decoder 400 may determine the memory cells connected to the selected word line and the selected bit line as selected memory cells.

The plurality of bit line sense amplifiers 500 may be connected to the plurality of bit lines. The plurality of bit line sense amplifiers 500 may write data to the selected memory cell through the selected bit line, among the plurality of bit lines. The plurality of bit line sense amplifiers 500 may read data stored in the selected memory cell through the selected bit line. In addition, the plurality of bit line sense amplifiers 500 may perform a refresh operation to rewrite the data in the selected memory cell such that a charge charged in the information storage capacitor of the selected memory cell may be naturally discharged not to lose the data. For example, a portion of the plurality of bit line sense amplifiers 500 may operate as data sense amplifiers, and the bit line sense amplifiers operating as the data sense amplifiers may be main bit line sense amplifiers.

The plurality of bit line sense amplifiers 500 may be driven according to control signals (e.g., ISO, OC, LANG, and LAPG) provided from the control logic 800. For example, the plurality of bit line sense amplifiers 500 may perform an offset cancellation operation according to an isolation signal (ISO) and an offset cancellation signal (OC). The offset may mean a difference in characteristics (e.g., a threshold voltage) between semiconductor devices constituting the plurality of bit line sense amplifiers 500.

According to some example embodiments, a portion of the bit line sense amplifiers 500 may operate as a PUF, and remaining portions thereof may operate as data sense amplifiers. A bit line sense amplifier operating as the PUF may be referred to as a PUF bit line sense amplifier.

The data buffer 600 may temporarily store data input from the memory controller, and may output the data to the plurality of bit line sense amplifiers 500. The data buffer 600 may temporarily store data output from the plurality of bit line sense amplifiers 500, and may output the data externally. According to some example embodiments, the address buffer 300 and/or the data buffer 600 may be implemented using memory (e.g., RAM, ROM, etc.).

The command decoder 700 may decode a write enable signal (/WE), a row address strobe signal (/RAS), a column address strobe signal (/CAS), a chip select signal (/CS), and the like, transmitted from the memory controller, to determine a command (CMD) transmitted from the memory controller. For example, the command (CMD) may be an active command, an auto refresh command, a precharge command, a write command, a read command, or the like.

The control logic 800 may control the plurality of bit line sense amplifiers 500 in response to the command (CMD). The control logic 800 may generate the control signals (e.g., ISO, OC, LANG, and LAPG) for controlling the plurality of bit line sense amplifiers 500.

The fuse circuit 910 may include at least one of an antifuse circuit, a laser fuse circuit, and/or an electrical fuse circuit. The fuse circuit 910 may store location information (FA) of at least one bad memory cell, among the plurality of memory cells included in the memory cell array 100. The bad memory cell may mean a memory cell having a hard defect or a soft defect. The location information (FA) of the bad memory cell stored in the fuse circuit 910 may be updated. The location information (FA) of the bad memory cell may be obtained by testing whether a bad bit occurs in the memory device 10. The test may be performed before packaging of the memory device 10, e.g., on a wafer level, or even after the packaging of the memory device 10. For example, post package repair (PPR) is possible.

According to some example embodiments, the fuse circuit 910 may store location information (PA) of the PUF. For example, the location information (PA) of the PUF may include location information of the PUF cell, location information of the PUF bit line, and location information of the PUF bit line sense amplifier.

The column repair logic 920 may generate a first control signal (CTRL1), based on the column address (CA) and the location information (PA) of the PUF. The control logic 800 may control a portion of the plurality of bit line sense amplifiers 500 to operate as the PUF bit line sense amplifier, based on the first control signal (CTRL1). For example, a portion of the bit line sense amplifiers, replaced with redundancy bit line sense amplifiers, among the plurality of bit line sense amplifiers 500, may be used to generate a PUF key including a unique random digital value. As used herein, the term "unique" may mean unique or uncommon.

According to some example embodiments, the control logic 800 may control a portion of the plurality of bit lines to operate as PUF bit lines, based on the first control signal (CTRL1).

The row repair logic 930 may generate a second control signal (CTRL2), based on the row address (RA) and the location information (PA) of the PUF. The row decoder 200 may control a portion of the plurality of memory cells and the plurality of redundancy memory cells to operate as PUF cells, based on the second control signal (CTRL2).

According to some example embodiments, the row repair logic 930 and the column repair logic 920 may replace the bad memory cell with the redundancy memory cell. The row repair logic 930 may generate a redundancy row address (RRA), based on the row address (RA) and the location information (FA) of the bad memory cell. The row decoder 200 may replace (e.g., associate commands containing the RA of the word line connected to the bad memory cell with an RA of redundancy word line) a word line connected to the bad memory cell with a redundancy word line connected to the plurality of redundancy memory cells, based on the redundancy row address (RRA). The column repair logic 920 may generate a replacement column address (RCA), based on the column address (CA) and the location information (FA) of the bad memory cell. The control logic 800 may replace (e.g., associate commands containing the CA of the bit line connected to the bad memory cell with an CA of redundancy bit line) a bit line to which the bad memory cell is connected with a redundancy bit line to which the plurality of redundancy memory cells are connected, based on the replacement column address (RCA).

According to some example embodiments of the present inventive concepts, the memory device 10 may control a portion of the bit line sense amplifiers 500 to operate as data sense amplifiers. According to some example embodiments, the memory device 10 may control a portion of the bit line sense amplifiers 500 to operate as a PUF bit line sense amplifier. According to some example embodiments, the memory device 10 may control a portion of the plurality of bit lines to operate as PUF bit lines. According to some example embodiments, the memory device 10 may control a portion of the plurality of memory cells and the plurality of redundancy memory cells to operate as PUF cells. Therefore, the memory device 10 may generate unpredictable chip-specific information. Using at least one of the PUF bit line sense amplifier, the PUF bit lines, and the PUF cells, the memory system may perform an authentication operation and/or a verification operation of a program, and/or an encryption operation and/or a decryption operation of data.

Figure 3:
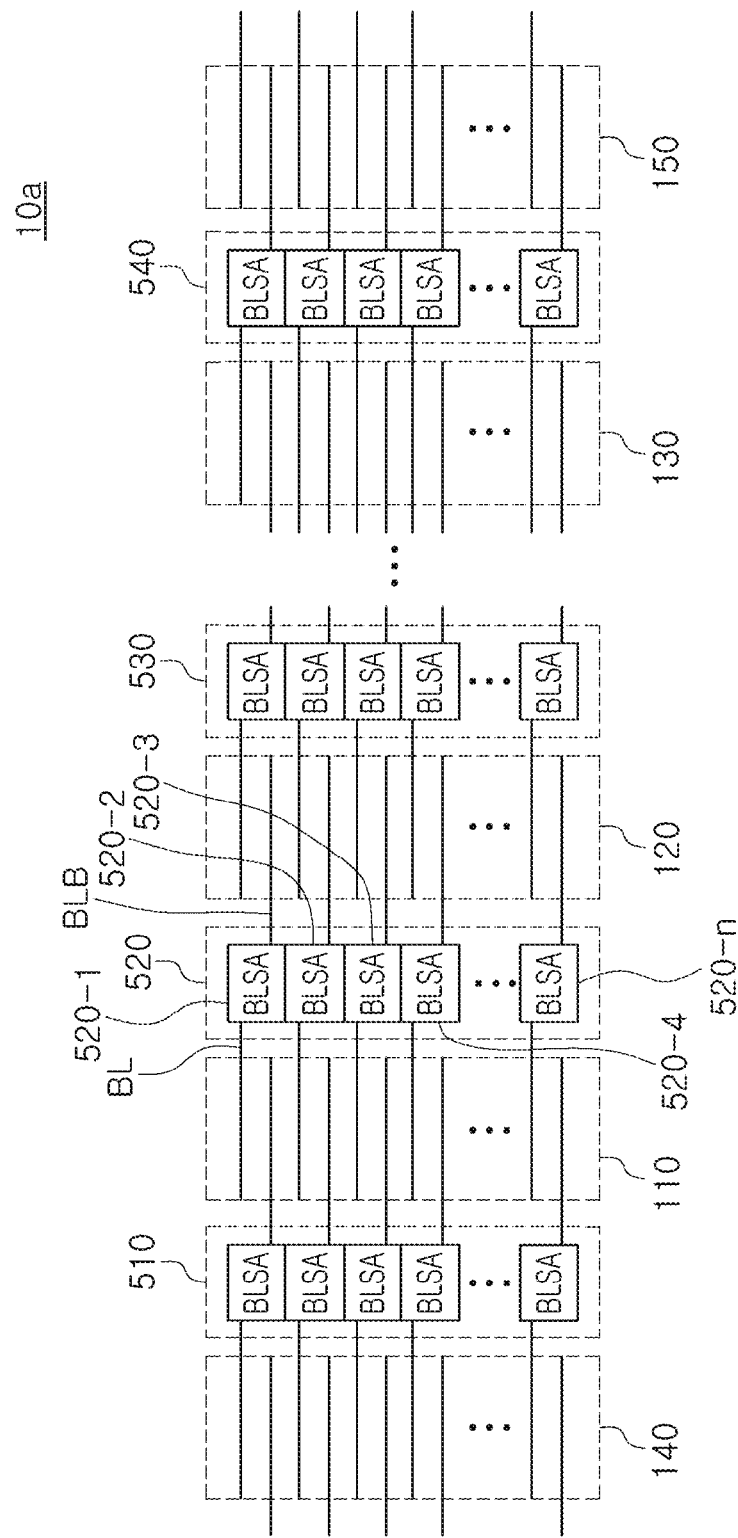
FIG. 3 is a block diagram illustrating a memory device according to some example embodiments of the present inventive concepts.

FIG. 3 is a block diagram illustrating a memory device according to some example embodiments of the present inventive concepts.

Referring to FIG. 3, a memory device 10a may include a plurality of memory cell arrays 110, 120, and 130, a plurality of redundancy memory cell arrays 140 and 150, and pluralities of sense amplifiers 510 to 540 (e.g., a first plurality of bit line sense amplifiers 510, a second plurality of bit line sense amplifiers 520, a third plurality of bit line sense amplifiers 530 and a fourth plurality of bit line sense amplifiers 540). Each of the plurality of sense amplifiers 510 to 540 may include a plurality of bit line sense amplifiers BLSA. The plurality of bit line sense amplifiers BLSA may be implemented with the plurality of bit line sense amplifiers 500 described in FIG. 2. According to some example embodiments, the memory device 10a corresponds to the memory cell array 100 and the bit line sense amplifiers 500 of the memory device 10.

A plurality of pairs of bit lines (BL and BLB) connected to the plurality of memory cell arrays 110, 120, and 130 may be connected to the plurality of bit line sense amplifiers BLSA. A portion of bit lines of the redundancy memory cell arrays 140 and 150 may be connected to adjacent bit line sense amplifiers BLSA as complementary bit lines. The remaining bit lines of the redundancy memory cell arrays 140 and 150 may not be connected to the bit line sense amplifiers BLSA as dummy bit lines.

According to some example embodiments, a portion of the plurality of bit line sense amplifiers BLSA may operate as a PUF. For example, a second bit line sense amplifier 520-2 and a fourth bit line sense amplifier 520-4 of a plurality of bit line sense amplifiers 520-1 to 520-n (e.g., a first bit line sense amplifier 520-1, a second bit line sense amplifier 520-2, a third bit line sense amplifier 520-3, a fourth bit line sense amplifier 520-4, . . . , an nth bit line sense amplifier 520-n) included in a sense amplifier 520 may be a PUF bit line sense amplifier, respectively. The PUF bit line sense amplifier may be a defective bit line sense amplifier having a high threshold voltage distribution of a transistor included in the PUF bit line sense amplifier. Whenever power is supplied to the PUF bit line sense amplifier, the PUF bit line sense amplifier may output data '0' or data '1,' according to a threshold voltage distribution of the transistor included in the PUF bit line sense amplifier. For example, the PUF bit line sense amplifier may randomly output unique data each time to which power is supplied. For example, the PUF bit line sense amplifier may output a unique random digital value.

For example, when the storage capacity of the memory device 10a is 8 Gbits, the number of defective bit line sense amplifiers may be 40,000 or more. Specifically, when storage capacity of the memory device 10a is 8 Gbits or 16 Gbits, the number of a plurality of bit line sense amplifiers BLSA may be about 4,000,000. 1% of bit line sense amplifiers, among the plurality of bit line sense amplifiers BLSA, may be defective bit line sense amplifiers. For example, the memory device 10a may include about 40,000 defective bit line sense amplifiers. Therefore, the memory device 10a may generate about 40,000,000 bits using defective bit line sense amplifiers.

In a first operation mode, for example, in a normal operation mode, the plurality of bit line sense amplifiers 520-1 to 520-n included in the sense amplifier 520 may write data in a selected memory cell or read data stored in the selected memory cell through bit lines BL connected to the first memory cell array 110 and the second memory cell array 120. In this case, a portion of the plurality of bit line sense amplifiers 520-1 to 520-n may be defective bit line sense amplifiers. For example, the second bit line sense amplifier 520-2 and the fourth bit line sense amplifier 520-4 may be defective bit line sense amplifiers, and the defective bit line sense amplifiers may be located between main bit line sense amplifiers as data sense amplifiers. The defective bit line sense amplifiers may be replaced with redundancy bit line sense amplifiers. The redundancy bit line sense amplifiers may operate as data sense amplifiers.

In a second operation mode, for example, in a PUF operation mode, the second bit line sense amplifier 520-2 and the fourth bit line sense amplifier 520-4 may be a PUF bit line sense amplifier, respectively. The memory device 10a may generate a unique random digital value by using the PUF bit line sense amplifier. The unique random digital value may be referred to as a PUF key. Since the PUF bit line sense amplifier generates the PUF key by using a threshold voltage distribution of a transistor included in the PUF bit line sense amplifier, the PUF key may output a unique random digital value every time in which it is generated. Therefore, the PUF key may be utilized as chip-specific information. For example, the PUF key may be used as an ID or a security key, that may be unique information of the memory device 10a.

Conventional electronic systems store key information (e.g., identifying information, security keys, etc.) in a non-volatile memory. Non-volatile memory is vulnerable to various security risks including physical security attacks. Accordingly, the conventional electronic systems fail to provide sufficient security for the key information.

However, some example embodiments provide for improved devices and systems configured to generate a key based on physically unclonable function (PUF) (also referred to herein as a PUF key). The PUF key is a unique random digital value based on physical properties of elements in a memory device. Accordingly, the PUF key cannot be modified or duplicated, or is difficult to modify or duplicate. Thus, the improved memory devices and systems overcome the deficiencies of the conventional electronic systems to provide for more secure key information.

Figure 4:
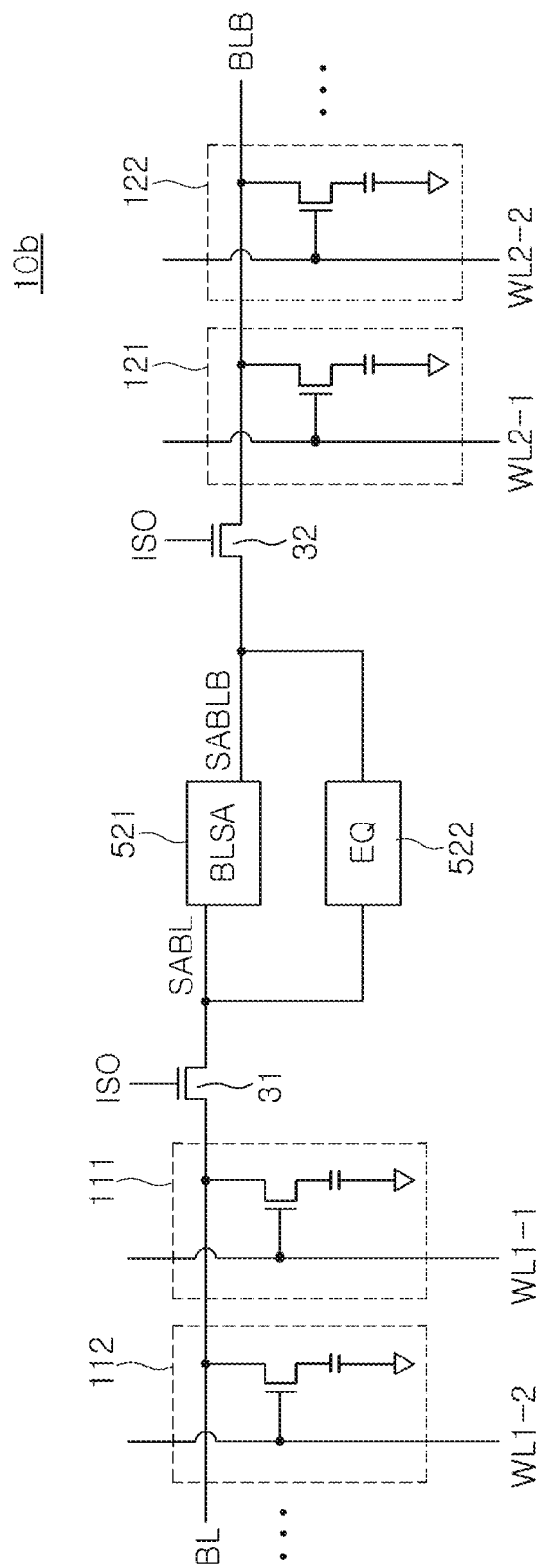
FIG. 4 is a view illustrating an operation of a memory device according to some example embodiments of the present inventive concepts.

FIG. 4 is a view illustrating an operation of a memory device according to some example embodiments of the present inventive concepts.

Referring to FIG. 4, a memory device 10b may include a plurality of memory cells 111 and 112 connected to a bit line (BL), a plurality of memory cells 121 and 122 connected to a complementary bit line (BLB), and/or a bit line sense amplifier 521, a precharge circuit (EQ) 522, a first isolation transistor 31, and/or a second isolation transistor 32, connected to the bit line (BL) and the complementary bit line (BLB). According to some example embodiments, the memory device 10b corresponds to the memory cell array 100 and the bit line sense amplifiers 500 of the memory device 10.

In a normal operation mode, the bit line sense amplifier 521 may sequentially perform a precharge operation, an offset cancellation operation, a charge sharing operation, a presensing operation, and/or a restore operation.

During the precharge operation, an isolation signal (ISO) may be logic high. Since the first isolation transistor 31 and the second isolation transistor 32 are turned on, a pair of the bit lines (BL and BLB) and a pair of sensing bit lines (SABL and SABLB) may be connected to each other. Under the control of the precharge circuit 522, the pair of bit lines (BL and BLB) may be precharged to a precharging voltage.

During the offset cancellation operation, the isolation signal (ISO) may be logic low, and may be stored such that voltages of the bit line (BL) and the complementary bit line (BLB) have a difference by an offset voltage. According to some example embodiments, the bit line sense amplifier 521 may compensate for the offset voltage during the offset cancellation operation.

When a first memory cell 111 is a selected memory cell, during the charge sharing operation, the isolation signal (ISO) may be logic low, and a word line (WL1-1) connected to the first memory cell 111 may be activated. Charge sharing may occur between a charge stored in a capacitor of the first memory cell 111 and a charge stored (e.g. a charge of the bit line) in the bit line (BL) (e.g., by combining the charges). For example, when data '1' is stored in the first memory cell 111, a voltage level of the bit line (BL) may increase by a predetermined level or alternatively, given level, during the charge sharing operation. When data '0' is stored in the first memory cell 111, a voltage level of the bit line (BL) may decrease by a predetermined level or alternatively, given level, during the charge sharing operation.

During the presensing operation, the isolation signal (ISO) may be logic low, and the sensing bit line (SABL) may increase by an internal power supply voltage, based on a difference in voltage between the bit line (BL) and the complementary bit line (BLB). The sensing bit line (SABLB) may decrease by a ground voltage.

During the restore operation, the isolation signal (ISO) may be logic high, the bit line (BL) may be charged to a voltage level of the sensing bit line (SABL), and the complementary bit line (BLB) may be discharged to a voltage level of the complementary sensing bit line (SABLB).

In a PUF operation mode, the memory device 10b may generate a PUF key. The PUF operation mode may include a first example, a second example, and a third example.

According to the first example, a bit line sense amplifier 521 may operate as a PUF bit line sense amplifier. The bit line sense amplifier 521 may generate a PUF key using a threshold voltage distribution of transistors included in the bit line sense amplifier 521. In this case, word lines (WL1-1, WL1-2, WL2-1, and WL2-2) connected to memory cells 111, 112, 121, and 122 may be inactivated during a charge sharing operation.

According to the second example, a threshold voltage distribution of transistors included in a bit line sense amplifier 521 and a mismatch between capacitance of a bit line (BL) and capacitance of a complementary bit line (BLB) may be used to generate a PUF key. In this case, word lines (WL1-1, WL1-2, WL2-1, and WL2-2) connected to memory cells 111, 112, 121, and 122 may be inactivated or deactivated (e.g., disconnected, deselected, unpowered, etc.) during a charge sharing operation, and an isolation signal (ISO) may be logic high during a presensing operation. Since the isolation signal (ISO) may be logic high during the presensing operation, when a memory device 10b generates a PUF key, a mismatch in capacitance between a pair of the bit lines (BL and BLB) may be reflected.

According to the third example, a threshold voltage distribution of transistors included in a bit line sense amplifier 521, a mismatch in capacitance between a pair of the bit lines (BL and BLB), and a mismatch between memory cells 111, 112, 121, and 122 may be used to generate a PUF key. The mismatch between the memory cells may include a mismatch in capacitance between the memory cells, a threshold voltage distribution of each of the transistors of the memory cells, and/or the like.

For example, a first memory cell 111 connected to the bit line (BL) and a second memory cell 121 connected to the complementary bit line (BLB) may operate as a PUF cell, respectively. According to some example embodiments, both of the first memory cell 111 and the second memory cell 121 may be normal memory cells. According to some example embodiments, both of the first memory cell 111 and the second memory cell 121 may be bad memory cells. According to some example embodiments, one of the first memory cell 111 and the second memory cell 121 may be a normal memory cell, and the other thereof may be a bad memory cell.

Both of the first memory cell 111 and the second memory cell 121 may write data '1' or data '0'. In this case, the bit line sense amplifier 521 may be a normal bit line sense amplifier without a defect, and may be a defective bit line sense amplifier with a defect. During the charge sharing operation, the first word line (WL1-1) and the second word line (WL2-1) connected to the first memory cell 111 and the second memory cell 121 may be simultaneously or contemporaneously activated. The bit line sense amplifier 521 may read data stored in the first memory cell 111 through the bit line (BL). During the charge sharing operation, since the first word line (WL1-1) and the second word line (WL2-1) may be activated at the same time or contemporaneously, a mismatch between the first memory cell 111 and the second memory cell 121 may be reflected, when the memory device 10b generates a PUF key.

The mismatch between the first memory cell 111 and the second memory cell 121 may include a mismatch between capacitance of the first memory cell 111 and capacitance of the second memory cell 121, a threshold voltage distribution of a transistor of the first memory cell 111 and a transistor of the second memory cell 121, and/or the like.

According to the mismatch of the first memory cell 111 and the second memory cell 121, the bit line sense amplifier 521 may read data '0' or data '1' through the bit line (BL). For example, probability that the bit line sense amplifier 521 reads the data '0' through the bit line (BL) and probability that the bit line sense amplifier 521 reads the data '1' through the bit line (BL) may be 50%, respectively.

Figure 5:
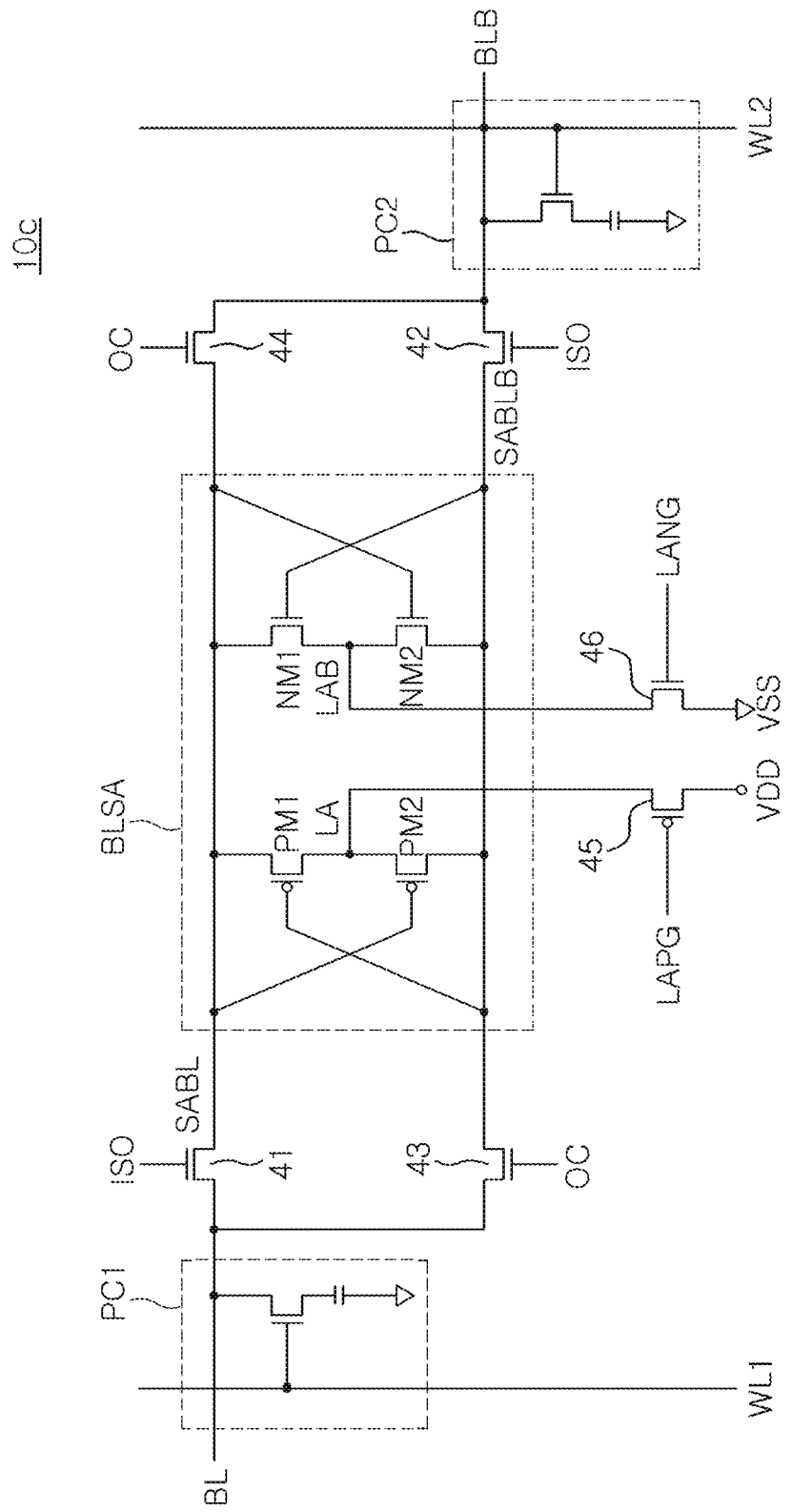
FIG. 5 is a circuit diagram illustrating a memory device according to some example embodiments of the present inventive concepts.

FIG. 5 is a circuit diagram illustrating a memory device according to some example embodiments of the present inventive concepts, and FIGS. 6 to 9 are timing diagrams illustrating an operation of a memory device according to some example embodiments of the present inventive concepts.

Referring to FIG. 5, a memory device 10c may include a first memory cell PC1 connected to a bit line (BL), a second memory cell PC2 connected to a complementary bit line (BLB), a first isolation transistor 41, a second isolation transistor 42, a first offset cancellation transistor 43, a second offset cancellation transistor 44, a bit line sense amplifier BLSA, a first switch 45, and/or a second switch 46. According to some example embodiments, the memory device 10c corresponds to the memory cell array 100 and the bit line sense amplifiers 500 of the memory device 10.

Figure 6:
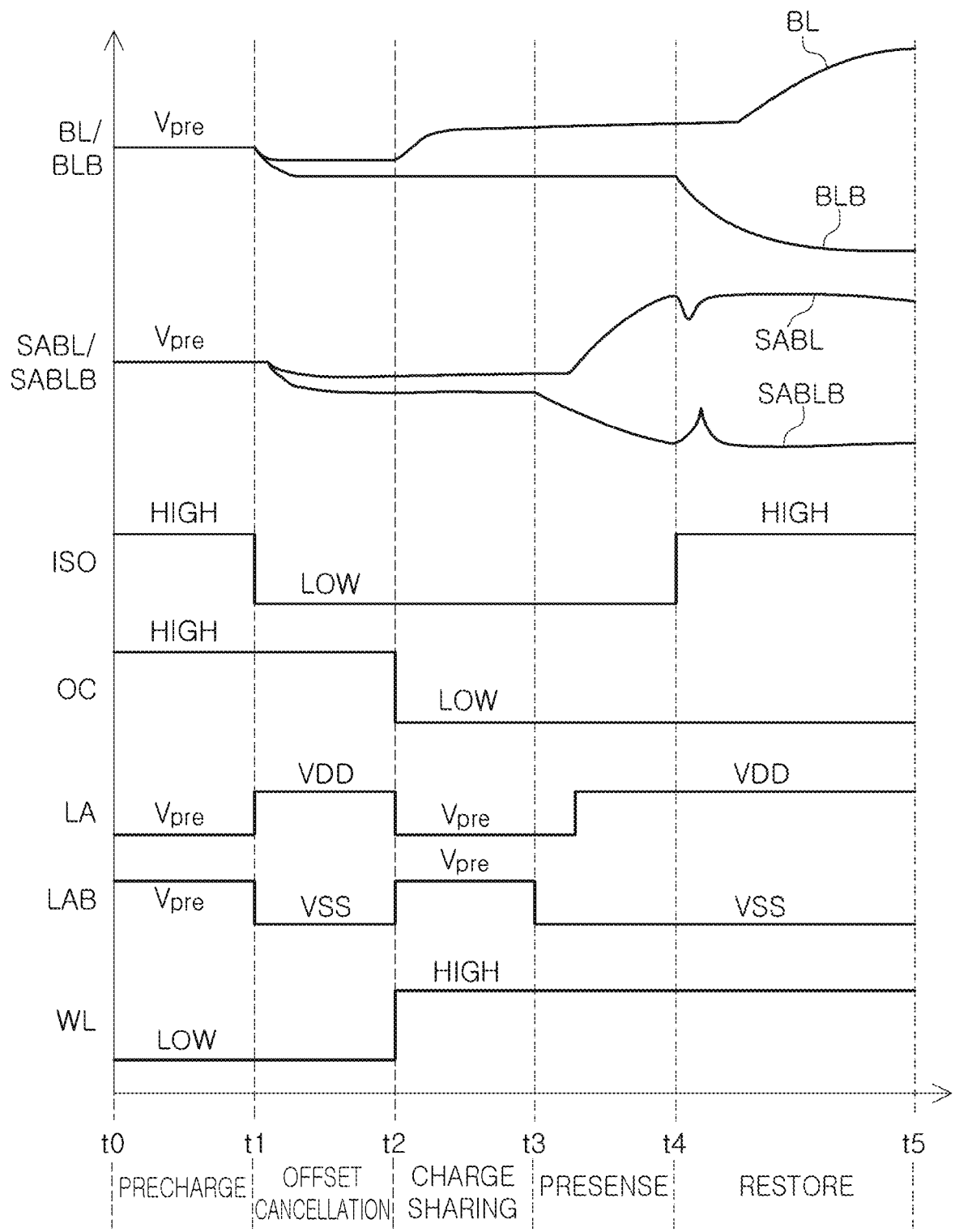
FIGS. 6 to 9 are timing diagrams illustrating an operation of a memory device according to some example embodiments of the present inventive concepts.

Referring to FIGS. 5 and 6 together, in a normal operation mode, the bit line sense amplifier BLSA may sequentially perform a precharge operation, an offset cancellation operation, a charge sharing operation, a presensing operation, and a restore operation.

During the precharge operation (t0 to t1), an isolation signal (ISO) may be logic high. The first isolation transistor 41 and the second isolation transistor 42 may be turned on in response to the isolation signal (ISO). Therefore, the bit line (BL) and a sensing bit line (SABL) may be connected, and the complementary bit line (BLB) and a complementary sensing bit line (SABLB) may be connected. An offset cancellation signal (OC) may be logic high. The first offset cancellation transistor 43 and the second offset cancellation transistor 44 may be turned on in response to the offset cancellation signal (OC). Therefore, the bit line (BL) and the complementary sensing bit line (SABLB) may be connected, and the complementary bit line (BLB) and the sensing bit line (SABL) may be connected. According to control of a precharge circuit, a pair of the bit lines (BL and BLB) and a pair of the sensing bit lines (SABL and SABLB) may be precharged to a precharging voltage (Vpre).

The bit line sense amplifier BLSA may include a first PMOS transistor PM1, a second PMOS transistor PM2, a first NMOS transistor NM1, and/or a second NMOS transistor NM2. Due to a variation, a temperature, and/or the like of an operation, a difference in threshold voltage may occur between a pair of the first transistors such as a pair of the PMOS transistors PM1 and PM2 and a pair of the second transistors such as a pair of the NMOS transistors NM1 and NM2. In this case, the bit line sense amplifier BLSA may generate offset noise due to a difference in threshold voltage between the pair of PMOS transistors PM1 and PM2 and the pair of NMOS transistors NM1 and NM2.

During the offset cancellation operation (t1 to t2), the isolation signal (ISO) may be logic low. A first control signal (LAPG) may be logic high. The first switch 45 may be turned on in response to the first control signal (LAPG). Therefore, a voltage of a first node LA may increase from the precharging voltage (Vpre) to a power supply voltage (VDD). Patent documents U.S. Ser. No. 15/697,164, U.S. Ser. No. 15/674,022, U.S. Ser. No. 15/208,640, and U.S. Ser. No. 14/264,466 disclose an offset cancellation operation. The general operation of offset cancellation of FIG. 6 may be understood with reference to the above patent documents.

A second control signal (LANG) may be logic high. The second switch 46 may be turned on in response to the second control signal (LANG). Therefore, a voltage of the second node LAB may decrease from the precharging voltage (Vpre) to a ground voltage (VSS). The power supply voltage (VDD) may be a voltage supplied to the memory cell array. In this case, the offset noise may be cancelled by storing voltages of the bit line (BL) and the complementary bit line (BLB) to be different from each other by an offset voltage.

During the charge sharing operation (t2 to t3), the isolation signal (ISO) and the offset cancellation signal (OC) may be logic low. The first control signal (LAPG) may be logic low. The first switch 45 may be turned off in response to the first control signal (LAPG). Therefore, the voltage of the first node LA may decrease from the power supply voltage (VDD) to the precharging voltage (Vpre). The second control signal (LANG) may be logic low. The second switch 46 may be turned off in response to the second control signal (LANG). Therefore, the voltage of the second node LAB may increase from the ground voltage (VSS) to the precharging voltage (Vpre).

When the first memory cell PCI is a selected memory cell, a first word line (WL1) connected to the first memory cell PC1 may be activated. Charge sharing may occur between a charge stored in a capacitor of the first memory cell PC1 and a charge stored in the bit line (BL). For example, when data '1' is stored in the first memory cell PC1, a voltage level of the bit line (BL) may increase by a predetermined level or alternatively, given level, during the charge sharing operation. In some example embodiments, when data '0' is stored in the first memory cell PC1, a voltage level of the bit line (BL) may decrease by a predetermined level or alternatively, given level, during the charge sharing operation.

During the presensing operation (t3 to t4), the bit line sense amplifier BLSA may presense a voltage of the bit line (BL) and a voltage of the complementary bit line (BLB) corresponding to the bit line (BL).

The first control signal (LAPG) may be logic high. The first switch 45 may be turned on in response to the first control signal (LAPG). Therefore, a first voltage of the first node LA may increase from the precharging voltage (Vpre) to the power supply voltage (VDD). The first control signal (LAPG) may be a first driving signal for driving the pair of PMOS transistors PM1 and PM2 to sense data of the first memory cell PC1.

The second control signal (LANG) may be logic high. The second switch 46 may be turned on in response to the second control signal (LANG). Therefore, a second voltage of the second node LAB may decrease from the precharging voltage (Vpre) to the ground voltage (VSS). The second control signal (LANG) may be a second driving signal for driving the pair of NMOS transistors NM1 and NM2 to sense data of the first memory cell PC1.

In a normal operation mode, the bit line sense amplifier BLSA may operate from the smallest threshold voltage distribution among the pair of NMOS transistors NM1 and NM2 and the pair of PMOS transistors PM1 and PM2. For example, when the pair of NMOS transistors NM1 and NM2 has a smaller threshold voltage distribution than the pair of PMOS transistors PM1 and PM2, the bit line sense amplifier BLSA may preferentially (e.g., first in order) operate the pair of NMOS transistors NM1 and NM2. Therefore, the second control signal (LANG) may be preferentially (e.g., first in order) enabled, and then the first control signal (LAPG) may be enabled. As a result, a voltage of the second node LAB may preferentially (e.g., first in order) decrease from the precharging voltage (Vpre) to the ground voltage (VSS), and then (e.g., subsequently) a voltage of the first node LA may increase from the precharging voltage (Vpre) to the power supply voltage (VDD).

Based on a difference in voltage between the bit line (BL) and the complementary bit line (BLB), the sensing bit line (SABL) may increase to an internal power supply voltage, and the complementary sensing bit line (SABLB) may decrease to a ground voltage.

In some example embodiments, during the presensing operation (t3 to t4), the first voltage of the first node LA and the second voltage of the second node LAB may increase or decrease in two steps. For example, in a first step, the first voltage of the first node LA may increase to a level lower than the power supply voltage (VDD), and the second voltage of the second node LAB may decrease to a level higher than the ground voltage (VSS). In a second step, the first voltage of the first node LA may increase to the power supply voltage (VDD), and the second voltage of the second node LAB may decrease to the ground voltage (VSS).

For example, during the presensing operation (t3 to t4), the bit line sense amplifier BLSA may increase a voltage supplied to the bit line sense amplifier BLSA to a level lower than the power supply voltage (VDD) by a first driving signal, and the bit line sense amplifier BLSA may decrease a voltage supplied to the bit line sense amplifier BLSA to a level higher than the ground voltage (VSS) and then to the ground voltage (VSS) by a second driving signal. Therefore, a sensing margin may be improved.

During the restore operation (t4 to t5), the isolation signal (ISO) may be logic high. The bit line (BL) may be charged to a voltage level of the sensing bit line (SABL), and the complementary bit line (BLB) may be discharged to a voltage level of the complementary sensing bit line (SABLB). Therefore, the voltage of the bit line (BL) may increase and the voltage of the complementary bit line (BLB) may decrease, based on a difference by the offset voltage.

Figure 7:
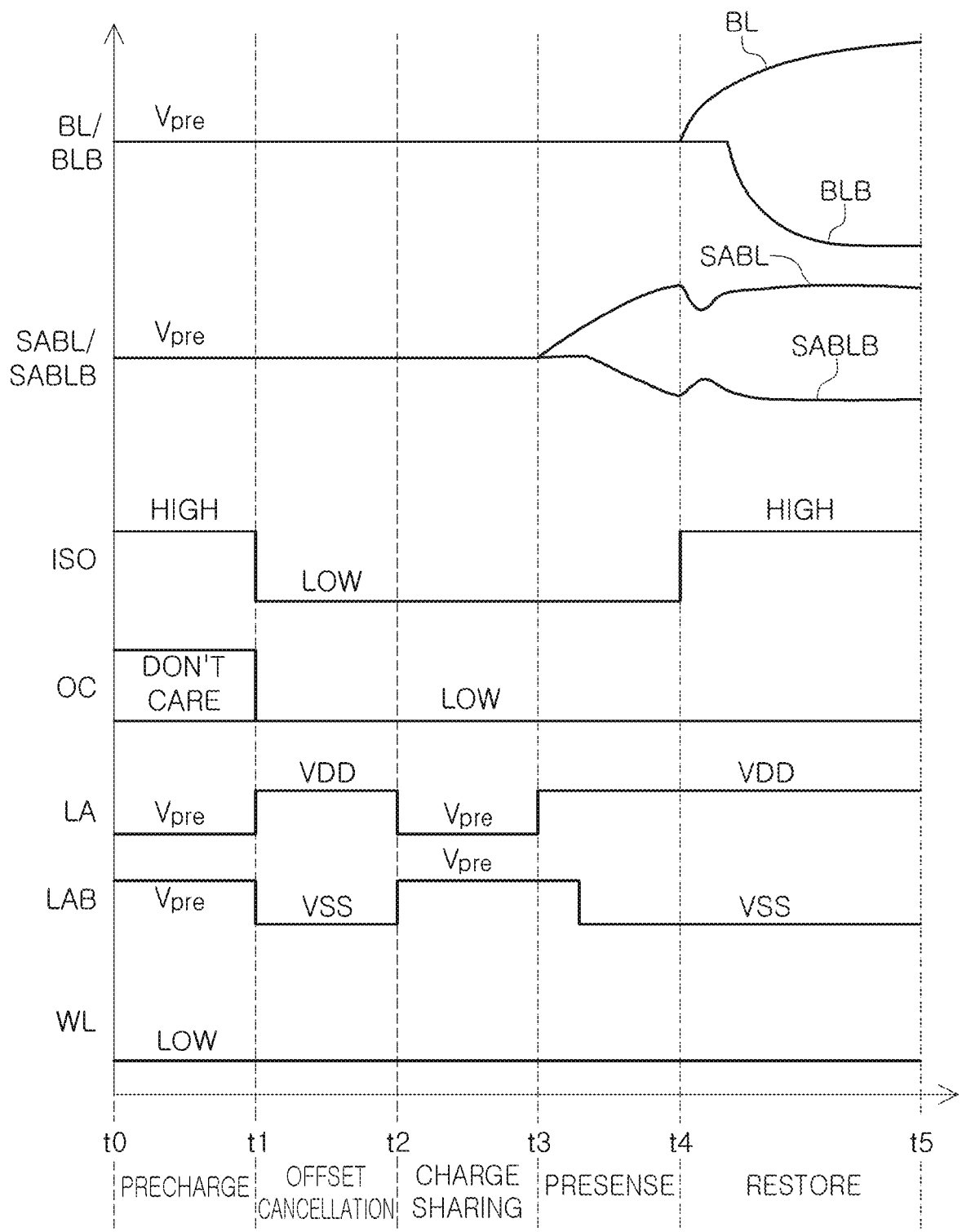

Referring to FIGS. 5 and 7 together, the bit line sense amplifier BLSA may operate as a PUF bit line sense amplifier in a PUF operation mode. The bit line sense amplifier BLSA may also be referred to as a PUF bit line sense amplifier herein, for example, when operating in the PUF operation mode.

During the precharge operation (t0 to t1), the isolation signal (ISO) may be logic high. The first isolation transistor 41 and the second isolation transistor 42 may be turned on in response to the isolation signal (ISO). Therefore, the bit line (BL) and the sensing bit line (SABL) may be connected, and the complementary bit line (BLB) and the sensing complementary bit line (SABLB) may be connected. The offset cancellation signal (OC) may be logic high or logic low.

When the offset cancellation signal (OC) is logic high, the pair of bit lines (BL and BLB) and the pair of sensing bit lines (SABL and SABLB) may be precharged to the precharging voltage (Vpre) under control of the precharge circuit.

Thereafter, in the PUF operation mode, since the offset cancellation signal (OC) may be inactivated and the word lines (WL1 and WL2) may be inactivated, the offset cancellation operation and the charge sharing operation may not occur.

During the presensing operation (t3 to t4), the first control signal (LAPG) may be logic high. The first switch 45 may be turned on in response to the first control signal (LAPG). Therefore, a voltage of the first node LA may increase from the precharging voltage (Vpre) to the power supply voltage (VDD). The second control signal (LANG) may be logic high. The second switch 46 may be turned on in response to the second control signal (LANG). Therefore, a voltage of the second node LAB may decrease from the precharging voltage (Vpre) to the ground voltage (VSS).

Unlike in the normal operation mode, in the PUF operation mode, the bit line sense amplifier BLSA may operate from (e.g., may operate a higher threshold voltage distribution among the pair of NMOS transistors NM1 and NM2 and the pair of PMOS transistors PM1 and PM2. For example, when the pair of PMOS transistors PM1 and PM2 has a higher threshold voltage distribution than the pair of NMOS transistors NM1 and NM2, the bit line sense amplifier BLSA may preferentially (e.g., first in order) operate the pair of PMOS transistors PM1 and PM2. Therefore, the first control signal (LAPG) may preferentially (e.g., first in order) become logic high and then (e.g., subsequently) the second control signal (LANG) may become logic high. Therefore, a voltage of the first node LA may preferentially (e.g., first in order) increase from the precharging voltage (Vpre) to the power supply voltage (VDD), and then a voltage of the second node LAB may decrease from the precharging voltage (Vpre) to the ground voltage (VSS).

For example, an order in which the pair of PMOS transistors and the pair of NMOS transistors of the bit line sense amplifier are driven in the normal operation mode may be different from an order in which the pair of PMOS transistors and the pair of NMOS transistors of the bit line sense amplifier are driven in the PUF operation mode. In addition, in the PUF operation mode, the first voltage of the first node LA may not increase or decrease in two stages, the first voltage of the first node LA may increase to the power supply voltage (VDD) at one time, and the second voltage of the second node LAB may decrease to the ground voltage (VSS).

For example, during the presensing operation (t3 to t4), the bit line sense amplifier BLSA may increase a voltage supplied to the bit line sense amplifier BLSA to the power supply voltage (VDD) by the first driving signal at one time, and the bit line sense amplifier BLSA may decrease a voltage supplied to the bit line sense amplifier BLSA to the ground voltage (VSS) by the second driving signal at one time.

According to the threshold voltage distribution of the transistors included in the PUF bit line sense amplifier, the sensing bit line (SABL) may increase to an internal power supply voltage or may decrease to a ground voltage. In contrast to the sensing bit line (SABL), the complementary sensing bit line (SABLB) may decrease to a ground voltage or may increase to an internal power supply voltage. For example, probability that the sensing bit line (SABL) increases to an internal power supply voltage, and the complementary sensing bit line (SABLB) decreases to a ground voltage, and probability that the sensing bit line (SABL) decreases to a ground voltage, and the complementary sensing bit line (SABLB) increases to an internal power supply voltage may be 50%, respectively. FIG. 7 illustrates an example in which the sensing bit line (SABL) increases to an internal power supply voltage and the complementary sensing bit line (SABLB) decreases to a ground voltage.

During the restore operation (t4 to t5), the isolation signal (ISO) may be logic high. The bit line (BL) may be charged or discharged to a voltage level of the sensing bit line (SABL), and the complementary bit line (BLB) may be discharged or charged to a voltage level of the complementary sensing bit line (SABLB). Therefore, a voltage of the bit line (BL) and a voltage of the complementary bit line (BLB) may increase or decrease based on the same precharging voltage or a similar precharging voltage.

For example, the PUF bit line sense amplifier may output data '0' or data '1,' depending on a threshold voltage distribution of transistors included in the PUF bit line sense amplifier. For example, probability that the bit line sense amplifier 521 outputs data '0' and probability that the bit line sense amplifier 521 outputs data '1' may be 50%, respectively.

Figure 8:
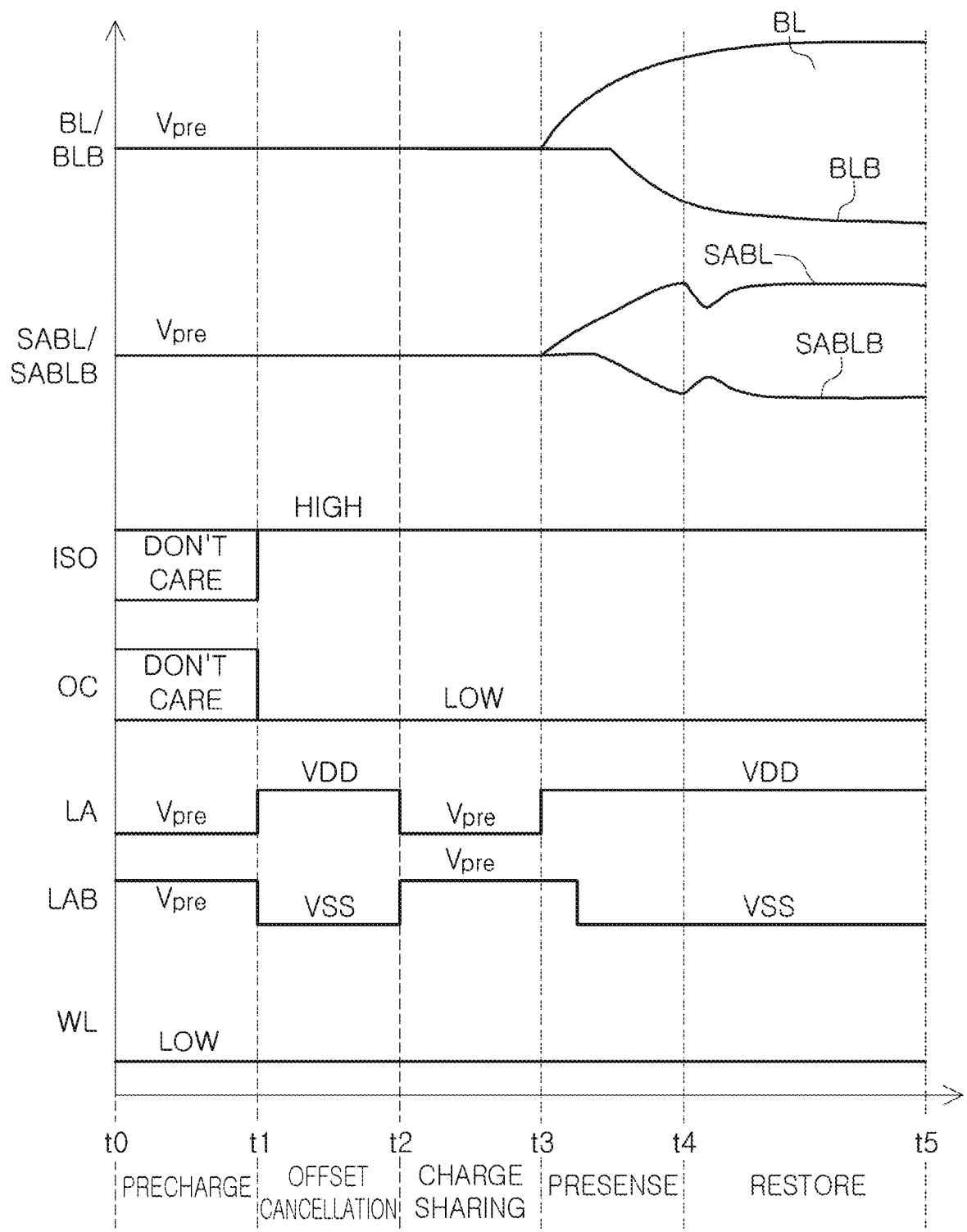

Referring to FIGS. 5 and 8 together, in the PUF operation mode, the PUF key may be generated using a threshold voltage distribution of transistors included in the bit line sense amplifier 521 and a mismatch in capacitance of the pair of bit lines (BL and BLB).

During the precharge operation (t0 to t1), the isolation signal (ISO) and the offset cancellation signal (OC) may be logic high or logic low. According to control of the precharge circuit, the pair of bit lines (BL and BLB) and the pair of sensing bit lines (SABL and SABLB) may be precharged to the precharging voltage (Vpre).

Thereafter, since the offset cancellation signal (OC) is logic low and the word line (WL1-1) connected to the first memory cell 111 is inactivated, the offset cancellation operation and the charge sharing operation may not occur.

During the presensing operation and the restore operation (t3 to t5), the isolation signal (ISO) may be logic high. Since the isolation signal (ISO) is logic high in the presensing operation, relative characteristics of capacitors of the bit line (BL) and the complementary bit line (BLB) may be reflected in the PUF operation mode.

According to the first control signal (LAPG), a voltage of the first node LA may increase from the precharging voltage (Vpre) to the power supply voltage (VDD). According to the second control signal (LANG), a voltage of the second node LAB may decrease from the precharging voltage (Vpre) to the ground voltage (VSS).

The sensing bit line (SABL) may increase to an internal power supply voltage, and the complementary sensing bit line (SABLB) may decrease to a ground voltage.

According to a threshold voltage distribution of transistors included in the PUF bit line sense amplifier, probability that the sensing bit line (SABL) increases to an internal power supply voltage, and the complementary sensing bit line (SABLB) decreases to a ground voltage, and probability that the sensing bit line (SABL) decreases to a ground voltage, and the complementary sensing bit line (SABLB) increases to an internal power supply voltage may be 50%, respectively.

The bit line (BL) may be charged or discharged to a voltage level of the sensing bit line (SABL), and the complementary bit line (BLB) may be discharged or charged to a voltage level of the complementary sensing bit line (SABLB).

For example, depending on a threshold voltage distribution of the transistor included in the PUF bit line sense amplifier and relative characteristics of capacitors of the bit line (BL) and the complementary bit line (BLB), the PUF bit line sense amplifier may use data '0' or data '1.' For example, probability that the bit line sense amplifier 521 outputs data '0' and probability that the bit line sense amplifier 521 outputs data '1' may be 50%, respectively.

Figure 9:
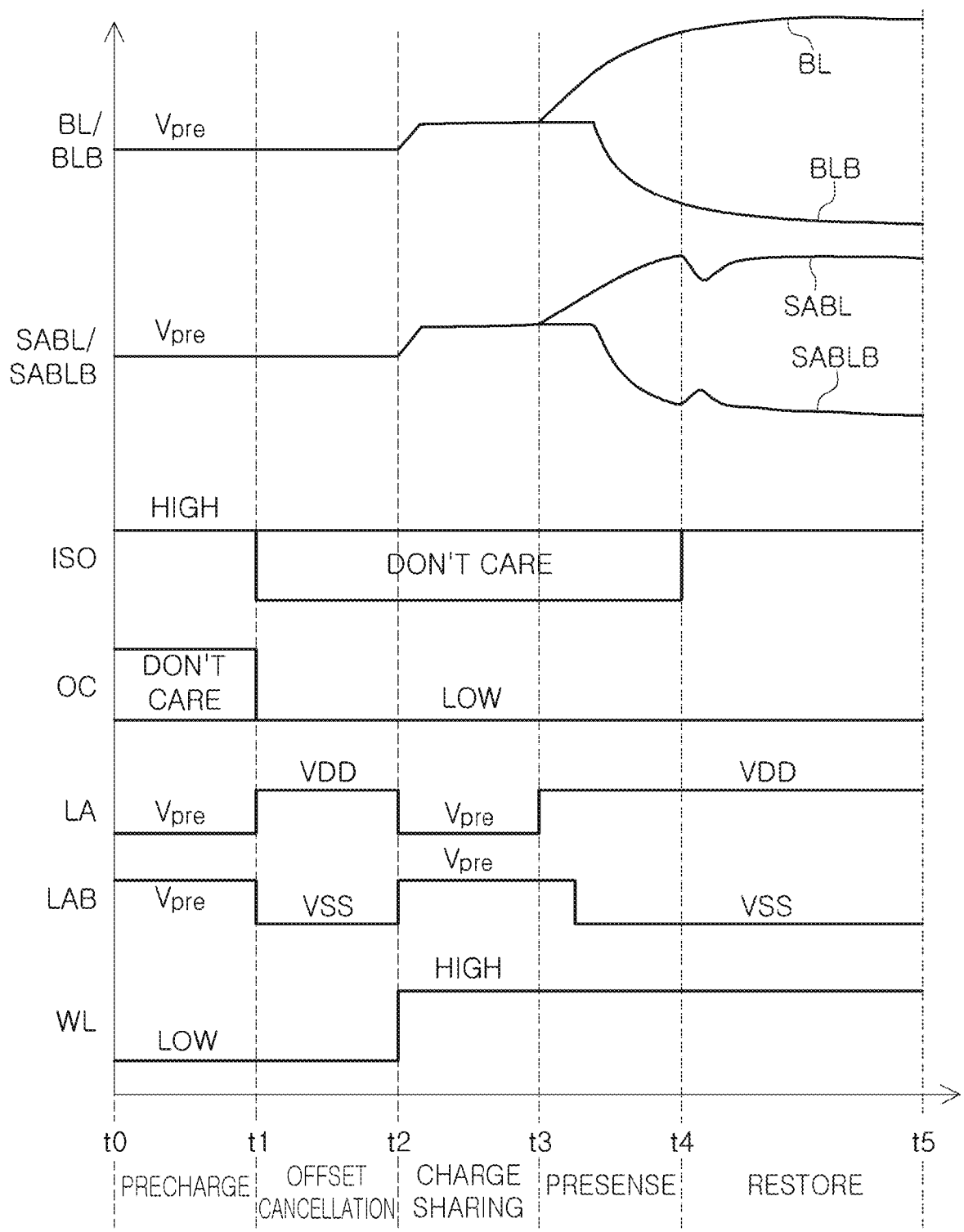

Referring to FIGS. 4-5 and 9 together, a threshold voltage distribution of transistors included in the bit line sense amplifier 521 in the PUF operation mode, a mismatch in capacitance of the pair of bit lines (BL and BLB), and a mismatch in capacitance of the memory cells 111, 112, 121, and 122 may be used to generate a PUF key.

The isolation signal (ISO) may be logic high during the precharge operation (t0 to t1). Since the first isolation transistor 41 and the second isolation transistor 42 may be turned on, the pair of bit lines (BL and BLB) and the pair of sensing bit lines (SABL and SABLB) may be connected to each other. The offset cancellation signal (OC) may be logic high or logic low. According to control of the precharge circuit, the pair of bit lines (BL and BLB) and the pair of sensing bit lines (SABL and SABLB) may be precharged to the precharging voltage (Vpre).

Thereafter, since the offset cancellation signal (OC) may be logic low, the offset cancellation operation may not occur.

During the charge sharing operation (t2 to t3), the isolation signal (ISO) may be logic high or logic low. According to the first control signal (LAPG), a voltage of the first node LA may decrease from the power supply voltage (VDD) to the precharging voltage (Vpre). According to the second control signal (LANG), a voltage of the second node LAB may increase from the ground voltage (VSS) to the precharging voltage (Vpre). The first word line (WL1) connected to the first memory cell PCI may be activated, and the second word line (WL2) connected to the second memory cell PC2 may be activated. Charge sharing may occur between a charge stored in a capacitor of the selected memory cell 111 and a charge stored in the bit line (B L).

In the PUF operation mode, both of the first memory cell PCI and the second memory cell PC2 may write data '1' or data '0.' The first word line (WL1) connected to the first memory cell PC1 and the second word line (WL2) connected to the second memory cell PC2 may be simultaneously or contemporaneously activated.

For example, when both of the first memory cell PC1 and the second memory cell PC2 write data '1', a voltage level of the bit line (BL) and a voltage level of the complementary bit line (BLB) may increase by a predetermined level or alternatively, given level, during the charge sharing operation. According to a mismatch between the first memory cell PC1 and the second memory cell PC2, a difference may occur between a voltage level of the bit line (BL) and a voltage level of the complementary bit line (BLB).

In the presensing operation (t3 to t4), the isolation signal (ISO) may be logic high or logic low. In the presensing operation (t3 to t4), when the isolation signal (ISO) is logic low, a voltage of the first node LA may increase from the precharging voltage (Vpre) to the power supply voltage (VDD) according to the first control signal (LAPG), and a voltage of the second node LAB may decrease from the precharging voltage (Vpre) to the ground voltage (VSS) according to the second control signal (LANG).

According to a threshold voltage distribution of transistors included in the PUF bit line sense amplifier, probability that the sensing bit line (SABL) increases to the internal power supply voltage, and the complementary sensing bit line (SABLB) decreases to the ground voltage, and probability that the sensing bit line (SABL) decrease to the ground voltage, and the complementary sensing bit line (SABLB) increases to the internal power supply voltage may be 50%, respectively.

In the restore operation (t3 to t5), the bit line (BL) may be charged or discharged to a voltage level of the sensing bit line (SABL), and the complementary bit line (BLB) may be discharged or charged to a voltage level of the complementary sensing bit line (SABLB). For example, according to a threshold voltage distribution of transistors included in the PUF bit line sense amplifier, a mismatch between capacitance of the bit line (BL) and capacitance of the complementary bit line (BLB), and a mismatch between the first memory cell PC1 and the second memory cell PC2, probability that the bit line (BL) is charged to a voltage level of the sensing bit line (SABL) and probability that the bit line (BL) is discharged to a voltage level of the sensing bit line (SABL) may be 50%, respectively.

The PUF bit line sense amplifier may sense data '0' or data '1' through the bit line (BL). For example, probability that the bit line sense amplifier 521 detects data '0' and probability that the bit line sense amplifier 521 detects data '1,' through the bit line (BL), may be 50%, respectively.

In the present specification, some example embodiments in which the offset cancellation operation does not occur in the PUF operation mode is illustrated and described, but the offset cancellation operation may occur in the PUF operation mode.

Figure 10:
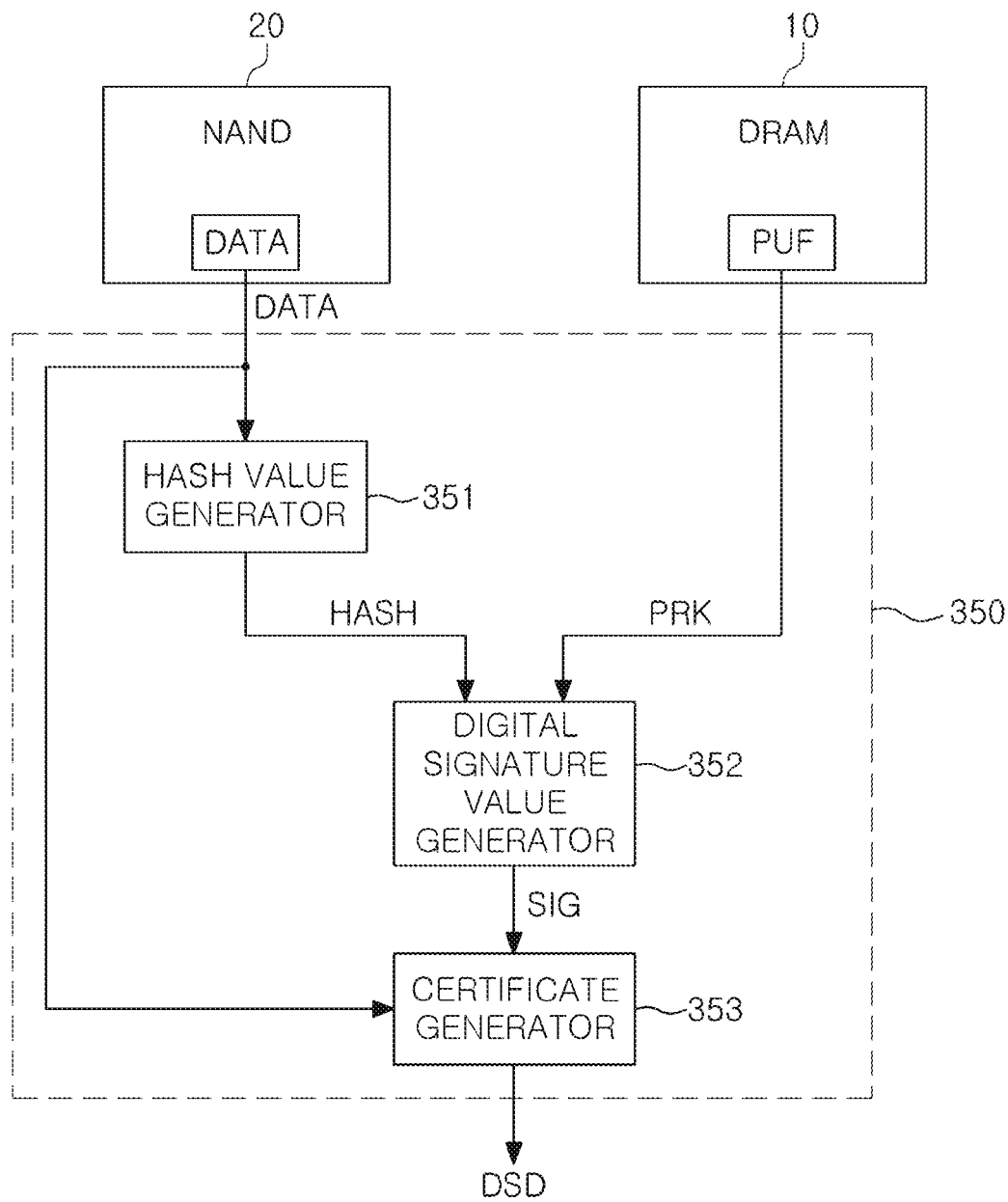
FIG. 10 is a view illustrating an authentication operation of a memory system according to some example embodiments of the present inventive concepts.
Figure 11:
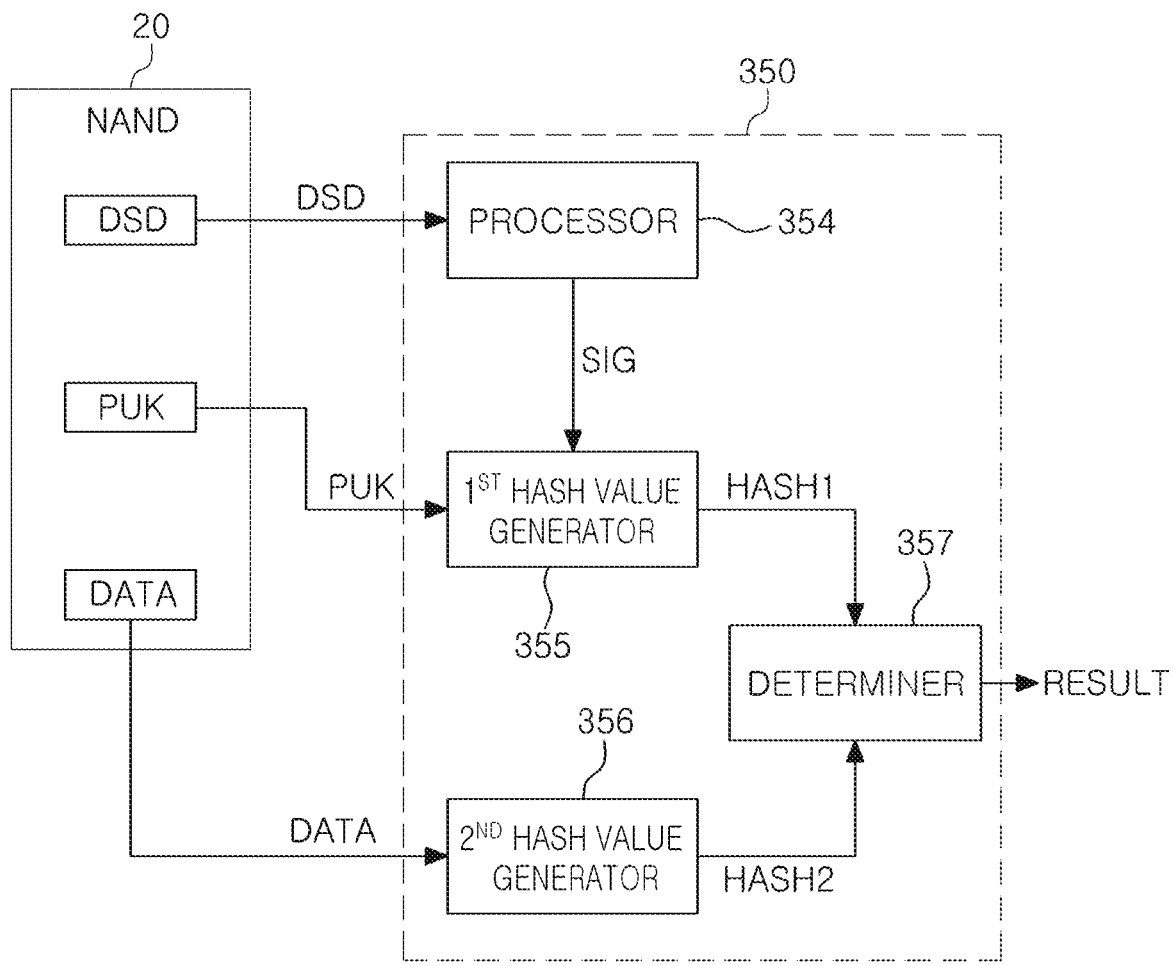
FIG. 11 is a view illustrating a verification operation of a memory system according to some example embodiments of the present inventive concepts.

FIG. 10 is a view illustrating an authentication operation of a memory system according to some example embodiments of the present inventive concepts, and FIG. 11 is a view illustrating a verification operation of a memory system according to some example embodiments of the present inventive concepts. A memory system may check whether a program is forged or modulated by an authentication and verification operation of a program such as firmware, a boot loader, or the like.

Referring to FIG. 10, a security module 350 may include a hash value generator 351, a digital signature value generator 352, and/or a certificate generator 353. The hash value generator 351 may receive data (DATA) from a second memory module 20. The data (DATA) may be a program such as firmware, a boot loader, or the like. The hash value generator 351 may generate a hash value (HASH) corresponding to the data (DATA) by using a hash function.

A first memory module 10 may generate a PUF key (PRK) in the same manner as, or a similar manner to, that described in association with in FIGS. 5 to 9. The digital signature value generator 352 may receive the hash value (HASH) from the hash value generator 351, and may receive the PUF key (PRK) from the first memory module 10. The PUF key (PRK) may be a private key. The digital signature value generator 352 may encrypt the hash value (HASH) using the PUF key (PRK), and may generate a digital signature value (SIG).

The certificate generator 353 may receive data (DATA) from the second memory module 20, and may receive the digital signature value (SIG) from the digital signature value generator 352. The certificate generator 353 may combine the data (DATA) and the digital signature value (SIG) to generate a certificate (DSD). The certificate (DSD) may be stored in the second memory module 20.

Referring to FIG. 11, a security module 350 may include a processor 354, a first hash value generator 355, a second hash value generator 356, and/or a determiner 357. The processor 354 may receive a certificate (DSD) from the second memory module 20. The processor 354 may separate a digital signature value (SIG) from the certificate (DSD).

The first hash value generator 355 may receive the digital signature value (SIG) from the processor 354, and may receive an encryption key (PUK) from the second memory module 20. For example, the encryption key (PUK) may be a public-key. The first hash value generator 355 may use the encryption key (PUK) to decrypt the digital signature value (SIG), and may generate a first hash value (HASH1).

The second hash value generator 356 may receive data (DATA) from the second memory module 20. The second hash value generator 356 may use a hash function to generate a second hash value (HASH2) corresponding to the data (DATA).

The determiner 357 may receive the first hash value (HASH1) from the first hash value generator 355, and may receive the second hash value (HASH2) from the second hash value generator 356. The determiner 357 may compare the first hash value (HASH1) and the second hash value (HASH2). As a result of the comparison, when the first hash value (HASH1) and the second hash value (HASH2) are the same or similar, the determiner 357 may determine a program corresponding to the data (DATA) is not forged or modulated. Therefore, a memory system 3 may execute the data (DATA).

As a result of the comparison, when the first hash value (HASH1) and the second hash value (HASH2) are different from each other, the determiner 357 may determine a program corresponding to the data (DATA) is forged or modulated. Therefore, the memory system 3 may not execute the data (DATA).

FIGS. 12 to 16 are views illustrating an operation of an encryption/decryption module according to some example embodiments of the present inventive concepts.

Figure 12A:
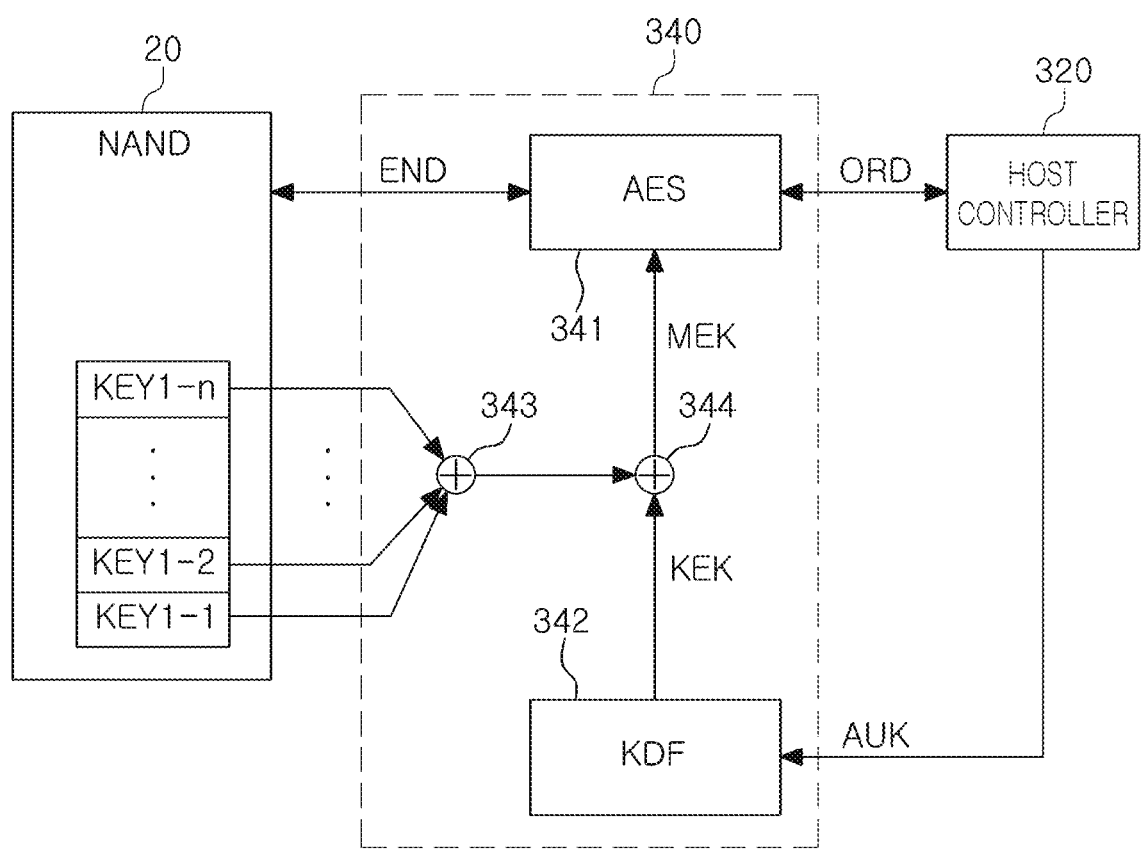
FIGS. 12A to 16B are views illustrating an operation of an encryption/decryption module according to some example embodiments of the present inventive concepts.

Referring to FIG. 12A, an encryption/decryption module 340 includes an advanced encryption standard (AES) engine 341, a key derivation function (KDF) engine 342, a first calculator 343, and/or a second calculator 344.

The AES engine 341 may perform a function of using an encryption key to encrypt and decrypt data. The AES engine 341 may receive original data (ORD) from a host controller 320. The original data (ORD) may refer to data before the data received from the host is encrypted.

The KDF engine 342 may receive an authentication key (AUK) from the host controller 320. The authentication key (AUK) may be a combination of an ID and a password (PW) received from a user or a personal identification number (pin number) received from the user. The KDF engine 342 may use the authentication key (AUK) to generate a key encryption key (KEK) having relatively high entropy.

The first calculator 343 may output one of a plurality of first keys (KEY1-1 to KEY1-n) stored in a second memory module 20, or a combination of at least two of the plurality of first keys (KEY1-1 to KEY1-n). The second calculator 344 may combine an output of the first calculator 343 and the key encryption key (KEK) to output a media encryption key (MEK).

The AES engine 341 may receive the media encryption key (MEK) from the second calculator 344. The AES engine 341 may use the media encryption key (MEK) to encrypt the original data (ORD) received from the host controller 320. The AES engine 341 may store encrypted data (END) in the second memory module 20.

Also, the AES engine 341 may receive the encrypted data (END) from the second memory module 20. The AES engine 341 may use the media encryption key (MEK) received from the second calculator 344 to decrypt the encrypted data (END). The AES engine 341 may transmit the original data (ORD) from which the encrypted data (END) is decrypted, to the host controller 320.

Figure 12B:
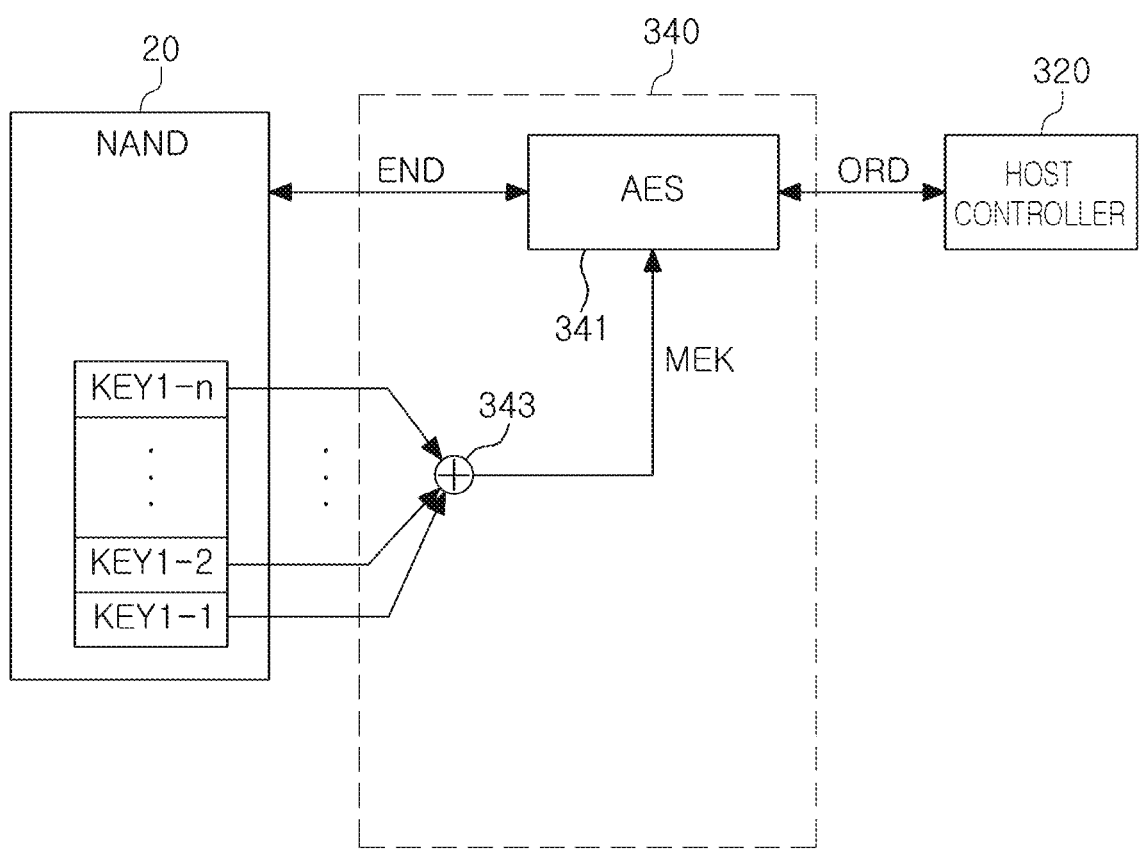

In FIG. 12B, an encryption/decryption module 340 may not include a KDF engine 342 and a second calculator 344, in a different manner to FIG. 12A. An AES engine 341 may use an output of a first calculator 343 to encrypt original data (ORD) received from a host controller 320 or decrypt encrypted data (END).

Figure 13A:
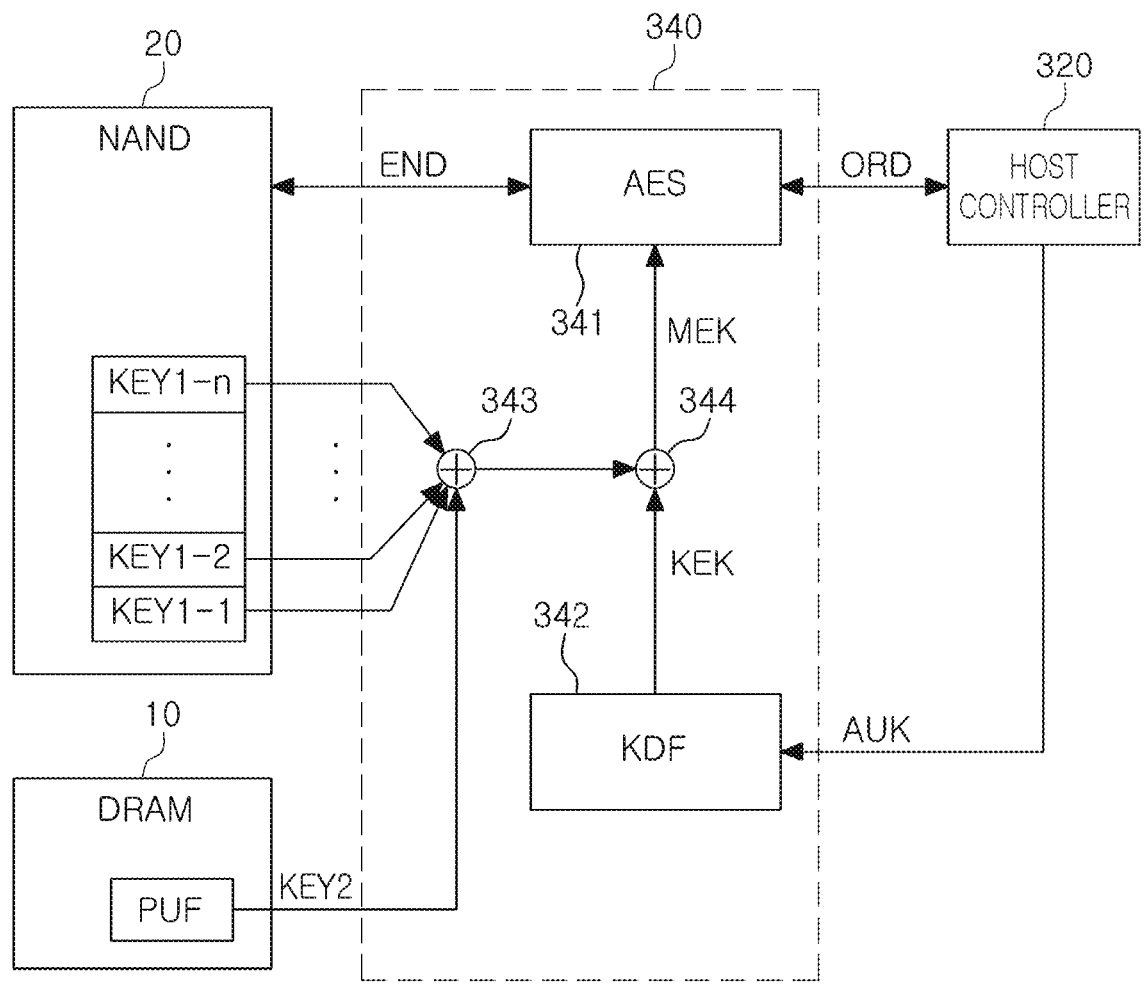

In FIG. 13A, a first calculator 343 may output one of a plurality of first keys (KEY1-1 to KEY1-$n$) stored in a second memory module 20, or a combination of at least two of the plurality of first keys (KEY1-1 to KEY1-$n$), in a different manner to FIG. 12A. A second key (KEY2) may be a PUF key generated in a first memory module 10, in the same manner as, or a similar manner to, that described in association with FIGS. 5 to 9. The second key (KEY2) may include a plurality of PUF keys, and may be one of the plurality of PUF keys or a combination of at least two of the plurality of PUF keys.

A second calculator 344 may combine an output of the first calculator 343 and a key encryption key (KEK) to output a media encryption key (MEK).

The AES engine 341 may use the output of the second calculator 344 to encrypt original data (ORD) received from the host controller 320 or decrypt the encrypted data (END).

Figure 13B:
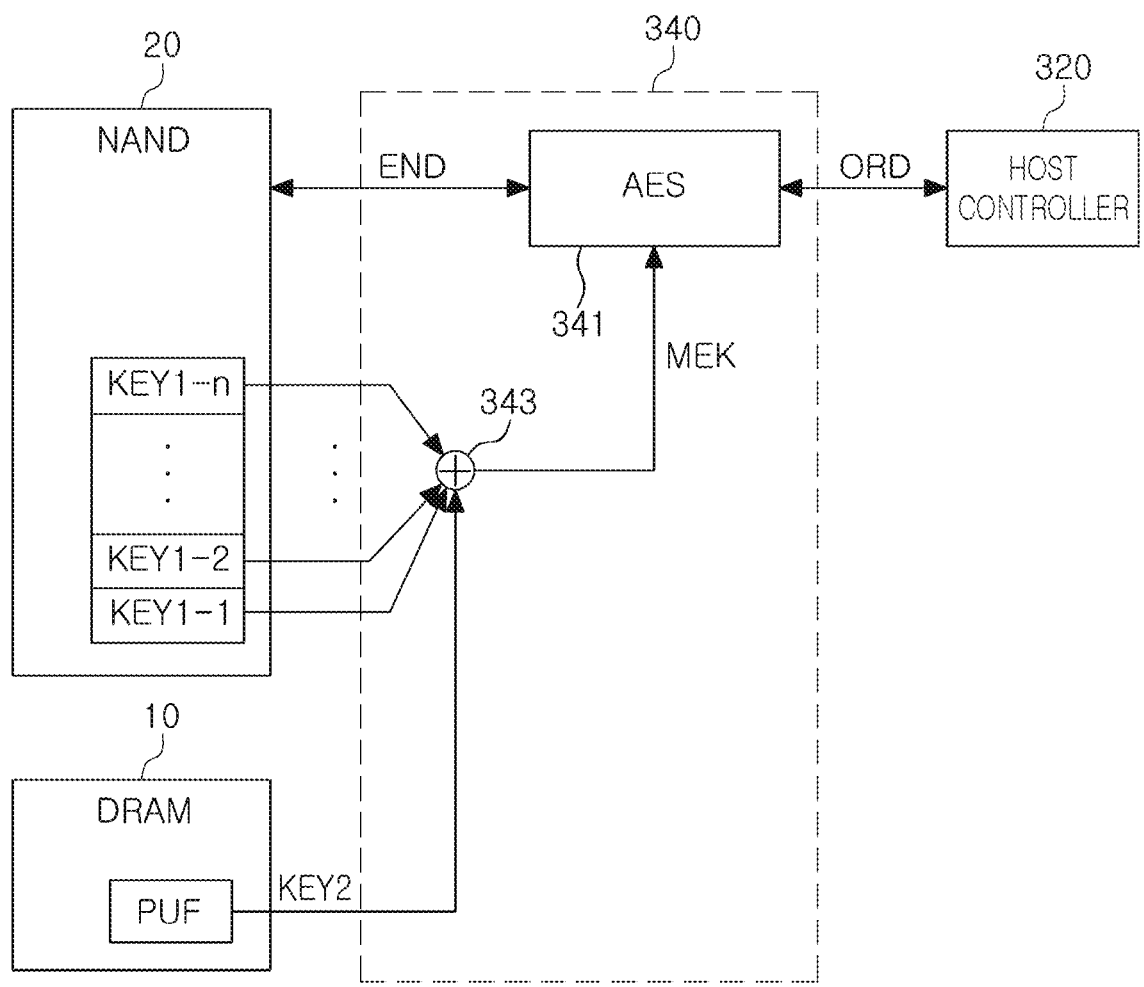

In FIG. 13B, an encryption/decryption module 340 may not include a KDF engine 342 and a second calculator 344, in a different manner to FIG. 13A. An AES engine 341 may use an output of a first calculator 343 to encrypt original data (ORD) received from a host controller 320 or decrypt encrypted data (END).

Figure 14A:
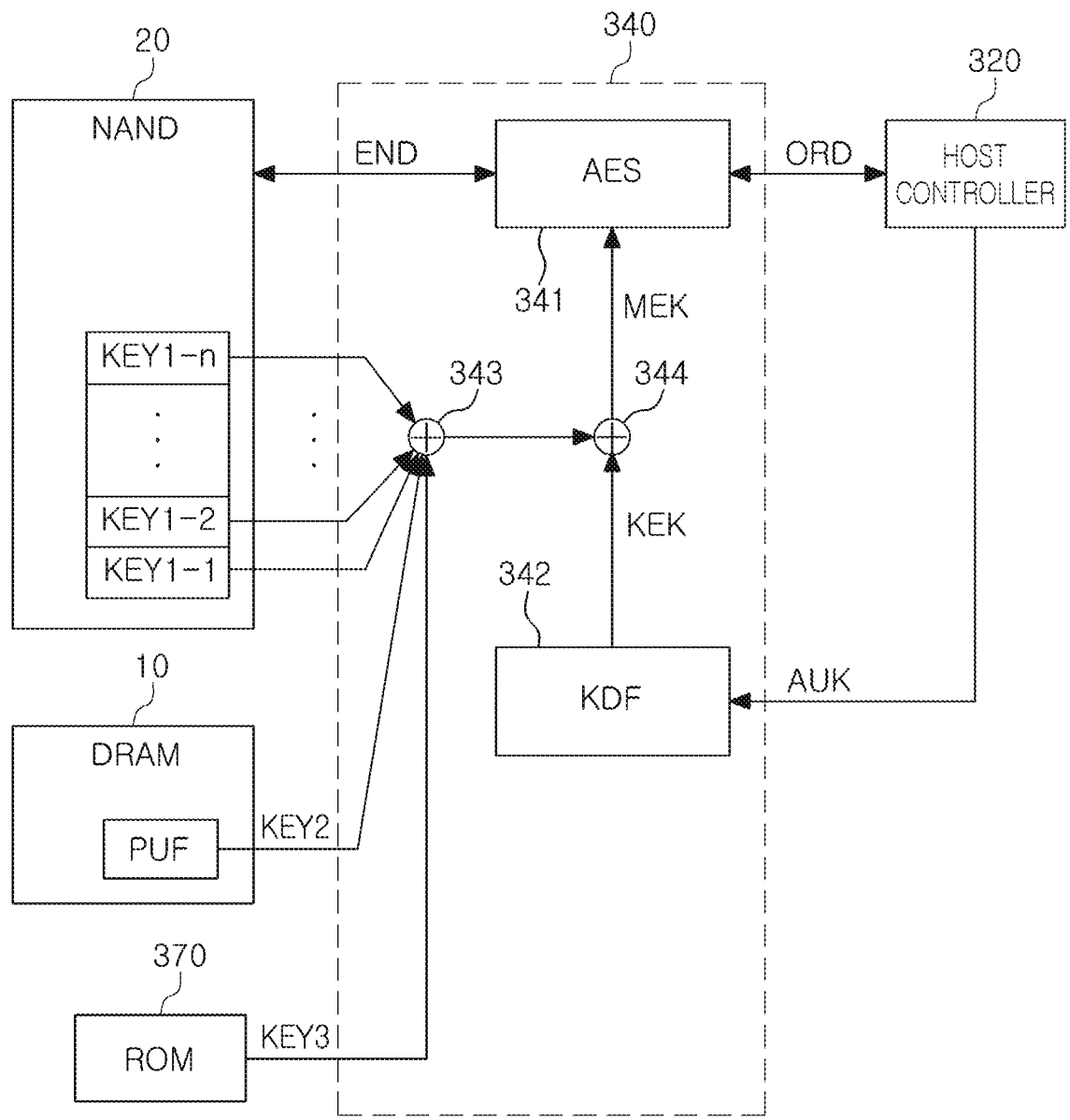

In FIG. 14A, a first calculator 343 may output combinations of one of a plurality of first keys (KEY1-1 to KEY1-$n$) stored in a second memory module 20, a second key (KEY2) received from a first memory module 10, and a third key (KEY3) received from a ROM 370, in a different manner to FIG. 13A. The third key (KEY3) may include (e.g., may be selected from) a plurality of keys, and may be one of the plurality of keys or a combination of at least two of the plurality of keys. The number of the third keys (KEY3) may be relatively smaller than the number of the first keys (KEY1-1 to KEY1-$n$) and the number of the second keys (KEY2).

A second calculator 344 may combine an output of the first calculator 343 and a key encryption key (KEK) to output a media encryption key (MEK).

An AES engine 341 may use the output of the second calculator 344 to encrypt original data (ORD) received from a host controller 320 or decrypt encrypted data (END).

Figure 14B:
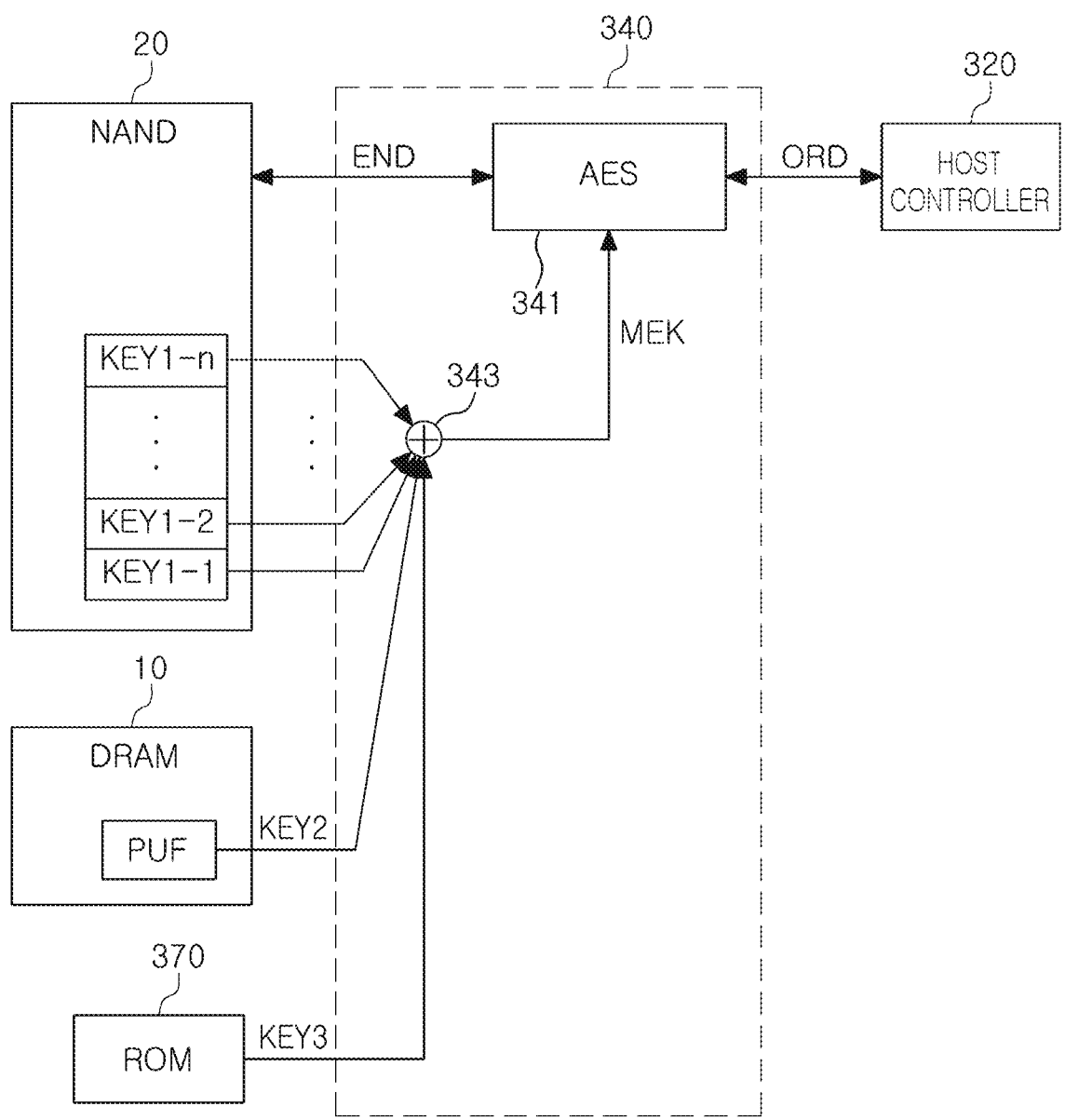

In FIG. 14B, an encryption/decryption module 340 may not include a KDF engine 342 and a second calculator 344, in a different manner to FIG. 14A. An AES engine 341 may use an output of a first calculator 343 to encrypt original data (ORD) received from a host controller 320 or decrypt encrypted data (END).

Figure 15A:
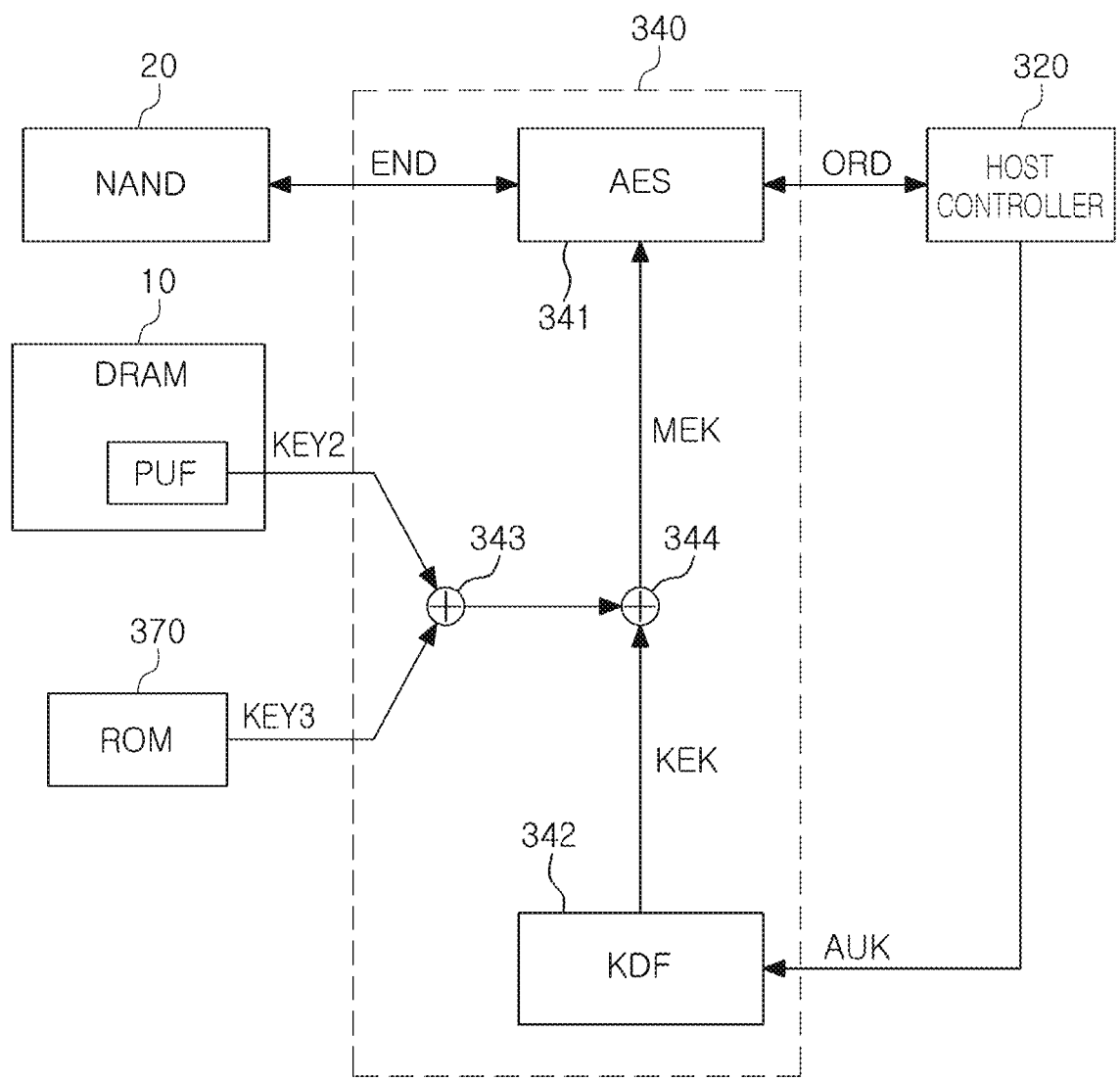

In FIG. 15A, a first calculator 343 may output combinations of a second key (KEY2) received from a first memory module 10 and a third key (KEY3) received from a ROM 370, in a different manner to FIG. 14A. A second calculator 344 may combine an output of the first calculator 343 and a key encryption key (KEK) to output a media encryption key (MEK).

An AES engine 341 may use the output of the second calculator 344 to encrypt original data (ORD) received from a host controller 320 or decrypt encrypted data (END).

Figure 15B:
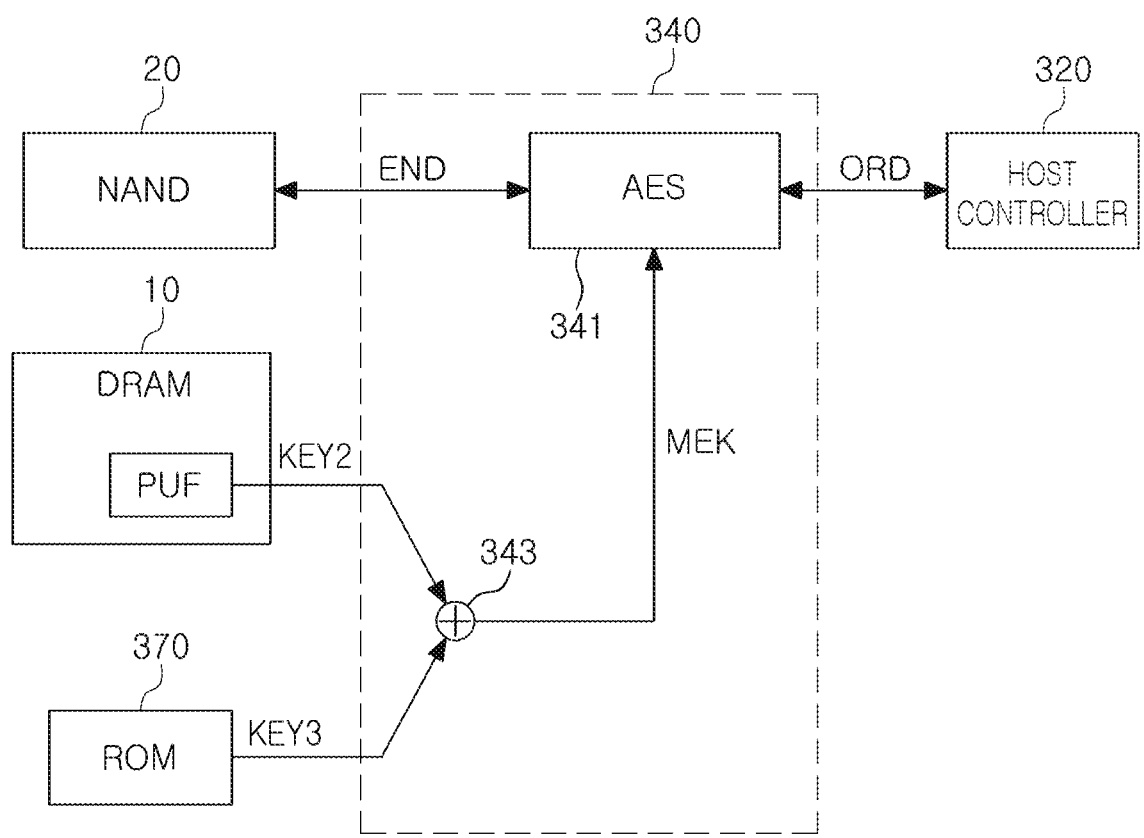

In FIG. 15B, an encryption/decryption module 340 may not include a KDF engine 342 and a second calculator 344, in a different manner to FIG. 15A. An AES engine 341 may use an output of a first calculator 343 to encrypt original data (ORD) received from a host controller 320 or decrypt encrypted data (END).

Figure 16A:
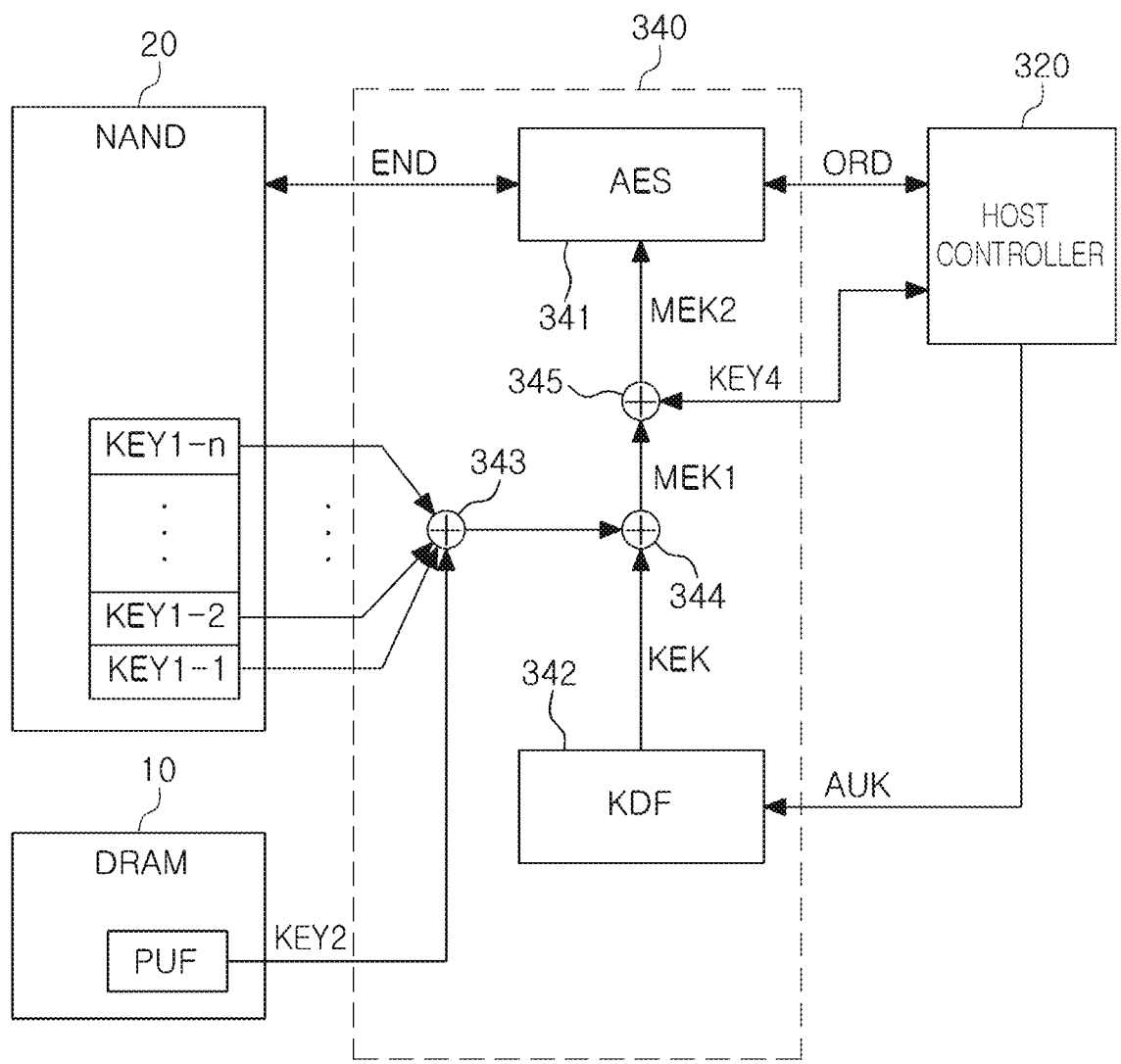

In FIG. 16A, an encryption/decryption module 340 may further include a third calculator 345, in a different manner to FIG. 13A. A host controller 320 may receive an encryption key, together with data, from a host. For example, the host controller 320 may receive one of the encryption keys per 4 KB of data from the host, and the encryption key may have a size of 128 to 256 bits.

The host controller 320 may transmit original data (ORD) to an AES engine 341, based on the data and the encryption key received from the host, and may transmit a fourth key (KEY4) to the third calculator 345.

A first calculator 343 may output combinations of one of a plurality of first keys (KEY1-1 to KEY1-$n$) stored in a second memory module 20, and a second key (KEY2) received from a first memory module 10. A second calculator 344 may combine an output of the first calculator 343 and a key encryption key (KEK) to output a first media encryption key (MEK1).

The third calculator 345 may receive the fourth key (KEY4) from the host controller 320, and may receive the first media encryption key (MEK1) from the second calculator 344. The third calculator 345 may combine the fourth key (KEY4) and the first media encryption key (MEK1) to generate a second media encryption key (MEK2).

The AES engine 341 may receive the second media encryption key (MEK2) from the third calculator 345. The AES engine 341 may use the second media encryption key (MEK2) to encrypt the original data (ORD) received from the host controller 320 or decrypt encrypted data (END).

Figure 16B:
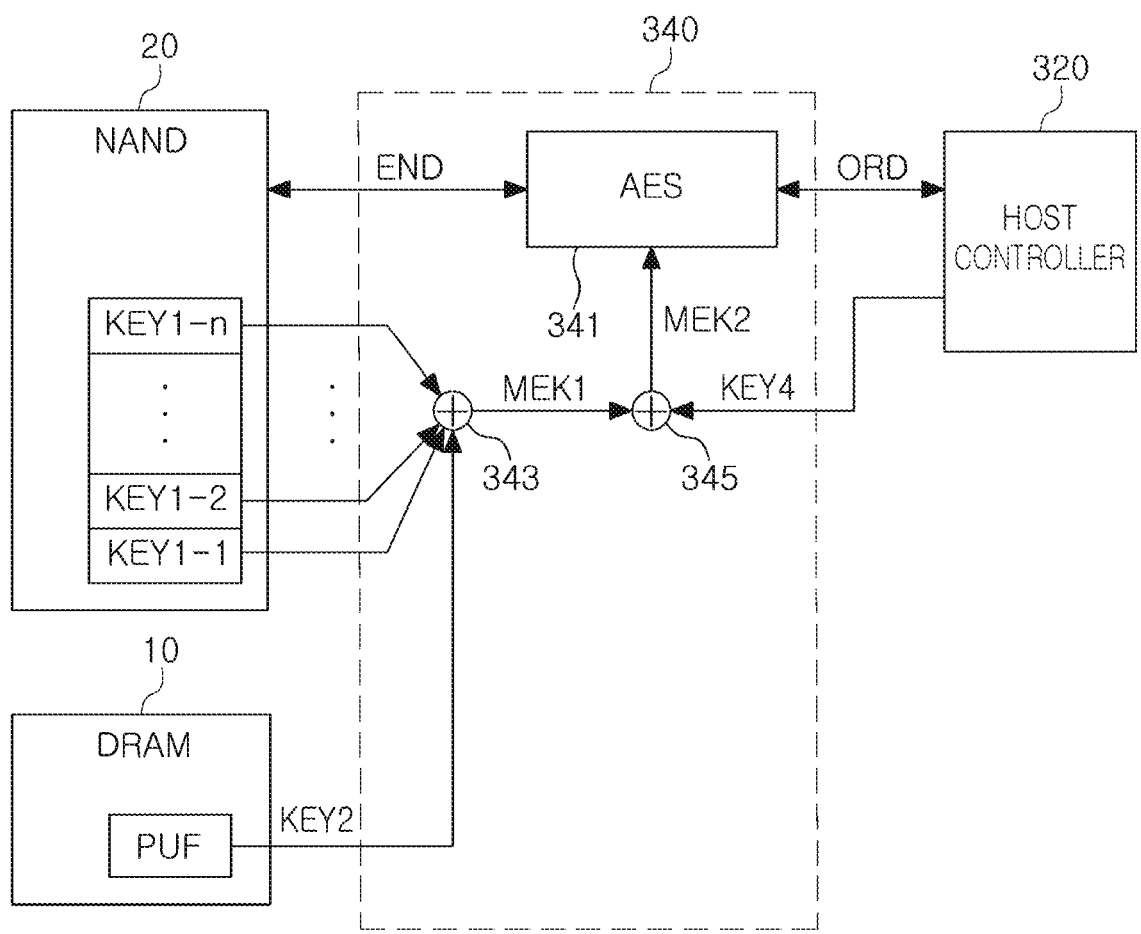

In FIG. 16B, an encryption/decryption module 340 may not include a KDF engine 342 and a second calculator 344, in a different manner to FIG. 16A. A third calculator 345 may combine an output of a first calculator 343 and a fourth key (KEY4) to generate a second media encryption key (MEK2).

An AES engine 341 may use the output of the third calculator 345 to encrypt original data (ORD) received from a host controller 320 or decrypt encrypted data (END).

According to some example embodiments of the present inventive concepts, unpredictable chip-specific information may be generated by using a distribution of elements included in a memory device. Therefore, a random digital value that cannot be modulated and duplicated, or that is difficult to modulate or duplicate, may be generated.

According to some example embodiments, operations described herein as being performed by the memory system 1, the memory controller 30, the DRAM controller 310, the host controller 320, the NVM controller 330, the encryption/decryption module 340, the security module 350, the CPU 360, the row decoder 200, the column decoder 400, the plurality of bit line sense amplifiers 500, the command decoder 700, the control logic 800, the fuse circuit 910, the column repair logic 920, the row repair logic 930, the hash value generator 351, the digital signature value generator 352, the certificate generator 353, the processor 354, the first hash value generator 355, the second hash value generator 356, the determiner 357, the AES engine 341, the KDF engine 342, the first calculator 343, the second calculator 344, the third calculator 345, and/or any other functional blocks, elements and/or modules described herein, may be performed by processing circuitry. The term 'processing circuitry,' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

Some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed concurrently, simultaneously, or in some cases be performed in reverse order.

It will be understood that when an element is referred to as being "connected" or "coupled" to another element, it can be directly connected or coupled to the other element or intervening elements may be present. As used herein the term "and/or" includes any and all combinations of one or more of the associated listed items.

The various operations of methods described above may be performed by any suitable device capable of performing the operations, such as processing circuitry. For example, the operations of methods described above may be performed by various hardware and/or software implemented in some form of hardware (e.g., processor, ASIC, etc.).

The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or operations of a method or algorithm and functions described in connection with some example embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Various advantages and effects of the present inventive concepts are not limited to the above description, it will be more readily understood in the process of describing some example embodiments of the present inventive concepts.

While some example embodiments have been shown and described above, it will be apparent to those skilled in the art that modifications and variations could be made without departing from the scope of the present inventive concepts as defined by the appended claims.

What is claimed is:

1. A memory system comprising:
    a plurality of memory cells at intersections between a plurality of word lines and a plurality of bit lines; and
    a plurality of bit line sense amplifiers connected to the plurality of bit lines, the plurality of bit line sense amplifiers configured to write data to or read data from the plurality of memory cells through the plurality of bit lines, a portion of bit line sense amplifiers among the plurality of bit line sense amplifiers configured to generate a physically unclonable function (PUF) key including a random digital value, the random digital value being determined according to threshold voltage distributions of transistors included in the portion of bit line sense amplifiers, and the threshold voltage distributions being different from one another,
    wherein each of the portion of bit line sense amplifiers is a defective bit line sense amplifier selected among the plurality of bit line sense amplifiers based on a threshold voltage distribution of transistors included in each of the plurality of bit line sense amplifiers,
    wherein the portion of bit line sense amplifiers are replaced with redundancy bit line sense amplifiers for data sense operation in a normal operation mode.

2. The memory system according to claim 1, wherein the memory system is a solid state drive (SSD).

3. The memory system according to claim 2, further comprising:
    processing circuitry configured to
        perform an authentication operation using the PUF key, and
        a verification operation using an encryption key.

4. The memory system according to claim 2, further comprising:
    processing circuitry configured to
        encrypt data transmitted from a host using the PUF key, or
        decrypt encrypted data using the PUF key.

5. The memory system according to claim 4, wherein the processing circuitry is configured to:
    receive an encryption key with the data from the host; and
    perform at least one of
        encrypting the data using the PUF key and the encryption key, or
        decrypting the encrypted data using the encryption key and the PUF key.

6. The memory system according to claim 5, wherein the encryption key has a size of 128 to 256 bits.

7. The memory system according to claim 1, further comprising:
    processing circuitry configured to perform an authentication operation using the PUF key, and a verification operation using an encryption key.

8. The memory system according to claim 1, further comprising:
    processing circuitry configured to
        encrypt data transmitted from a host using the PUF key, or
        decrypt encrypted data using the PUF key.

9. The memory system according to claim 8, wherein the processing circuitry is configured to:
    receive an encryption key with the data from the host; and
    perform at least one of
        encrypting the data using the PUF key and the encryption key, or decrypting the encrypted data using the encryption key and the PUF key.

10. The memory system according to claim 9, wherein the encryption key has a size of 128 to 256 bits.

11. The memory system according to claim 1, wherein the portion of bit line sense amplifiers is configured to generate the PUF key contemporaneous with inactivation of the plurality of word lines.

12. The memory system according to claim 11, wherein the memory system is a solid state drive (SSD).

13. A memory device comprising:
a memory cell array including a plurality of memory cells at intersections between a plurality of word lines and a plurality of bit lines;
a first bit line sense amplifier connected to a first bit line among the plurality of bit lines, the first bit line sense amplifier configured to operate as a data sense amplifier including writing data to or reading data from the plurality of memory cells through the first bit line; and
second bit line sense amplifiers connected to second bit lines among the plurality of bit lines, the second bit line sense amplifiers configured to operate as physically unclonable function (PUF) bit line sense amplifiers including generating a PUF key as a random digital value, the random digital value being determined according to threshold voltage distributions of transistors included in the second bit line sense amplifiers, and the threshold voltage distributions being different from one another,
wherein the transistors included in the second bit line sense amplifier have a higher threshold voltage distribution than transistors included in the first bit line sense amplifier,
wherein the second bit line sense amplifiers are replaced with redundancy bit line sense amplifiers for data sense operation in a normal operation mode.

14. The memory device according to claim 13, wherein the first bit line sense amplifier and each of the second bit line sense amplifiers includes a pair of PMOS transistors and a pair of NMOS transistors; and
the memory device further comprises processing circuitry configured to
drive the pair of PMOS transistors and the pair of NMOS transistors of the first bit line sense amplifier in a first order in a presensing period, the presensing period being a period in which voltages of the plurality of bit lines and voltages of a plurality of complementary bit lines corresponding to the plurality of bit lines are presensed, and
drive the pair of PMOS transistors and the pair of NMOS transistors of each of the second bit line sense amplifiers in a second order in the presensing period, the first order being different from the second order.

15. The memory device according to claim 14, wherein the processing circuitry is configured to:
drive one of the pair of PMOS transistors and the pair of NMOS transistors of the first bit line sense amplifier having a smaller threshold voltage distribution before driving another of the pair of PMOS transistors and the pair of NMOS transistors of the first bit line sense amplifier; and
drive one of the pair of PMOS transistors and the pair of NMOS transistors of each of the second bit line sense amplifiers having a higher threshold voltage distribution before driving another of the pair of PMOS transistors and the pair of NMOS transistors of each of the second bit line sense amplifiers.

16. The memory device according to claim 13, further comprising:
processing circuitry configured to associate a command corresponding to a bit line connected to one of the second bit line sense amplifiers with a bit line connected to a third bit line sense amplifier, the third bit line sense amplifier configured to operate as a data sense amplifier.

17. The memory device according to claim 16, wherein the processing circuitry is configured to:
store location information of a bad memory cell among the plurality of memory cells; and
store location information of the second bit line sense amplifiers.

18. The memory device according to claim 13, further comprising:
processing circuitry configured to perform an offset cancellation operation using the first bit line sense amplifier without using the second bit line sense amplifiers, the offset cancellation operation includes compensating for a difference between threshold voltages of a pair of PMOS transistors of the first bit line sense amplifier and threshold voltages of a pair of NMOS transistors of the first bit line sense amplifier.

19. The memory device according to claim 13, wherein a number of the second bit line sense amplifiers being 40,000 or more, and a capacity of the memory device being at least 16 gigabits.

20. The memory device according to claim 13, wherein the second bit line sense amplifiers are configured to generate the PUF key contemporaneous with inactivation of the plurality of word lines.

* * * * *